United States Patent [19]
Kreynin et al.

[11] Patent Number: 6,067,570
[45] Date of Patent: May 23, 2000

[54] METHOD AND SYSTEM FOR DISPLAYING AND INTERACTING WITH AN INFORMATIONAL MESSAGE BASED ON AN INFORMATION PROCESSING SYSTEM EVENT

[75] Inventors: Vadim Kreynin, Hollywood; Joseph M. Mosely; Michael G. Makar, both of Boca Raton, all of Fla.

[73] Assignee: The Delfin Project, Inc., Boca Raton, Fla.

[21] Appl. No.: 09/113,453

[22] Filed: Jul. 10, 1998

Related U.S. Application Data

[60] Provisional application No. 60/062,600, Oct. 17, 1997.

[51] Int. Cl.[7] .................................................. G06F 13/00
[52] U.S. Cl. ........................................ 709/227; 345/347
[58] Field of Search ................................. 709/227, 217, 709/218; 705/404, 418; 364/479.01; 345/347, 342

[56] References Cited

U.S. PATENT DOCUMENTS

| | | | |
|---|---|---|---|
| 5,289,168 | 2/1994 | Freeman | 345/121 |
| 5,572,643 | 11/1996 | Judson | 709/218 |
| 5,673,404 | 9/1997 | Cousins et al. | 395/347 |
| 5,809,242 | 9/1998 | Shaw et al. | 709/217 |
| 5,838,790 | 11/1998 | McAuliffe et al. | 380/4 |
| 5,848,397 | 12/1998 | Marsh et al. | 705/14 |

*Primary Examiner*—John A. Follansbee
*Attorney, Agent, or Firm*—Jon A. Gibbons; Fleit, Kain, Gibbons, Gutman & Bongini, P.L.

[57] ABSTRACT

A method is illustrated the flow diagram 100 of FIG. 1. A processor 1001 renders a message 1025 for the processor operator's education during times of processor latency 1015 such as dialing onto any network such as the Internet. This wait time 1017 is normally non-productive and therefore can be used in such a way as to be non-invasive. It is also understood that this time is short so as to make other actions such as getting up from the desk not attractive. Finally even if the wait time was or became very short the present invention provides the first message 1025 to the process operator, that has been filtered. This filtering is a balance of the message owner's willingness to out bid other messages, the time of the day, the location of the operator, and finally the operator's likes and dislikes.

57 Claims, 21 Drawing Sheets

FIG. 19

METHOD AND SYSTEM FOR DISPLAYING AND INTERACTING WITH AN INFORMATIONAL MESSAGE BASED ON AN INFORMATION PROCESSING SYSTEM EVENT

CROSS-REFERENCE TO RELATED APPLICATIONS

This non-provisional application is based on the provisional patent application Ser. No. 60/062,600 to Vadim Kreynin et al., for "A Method and system for displaying and interacting with an informational message based on an information processing system event" filed Oct. 17, 1997.

BACKGROUND OF THE INVENTION

1. Field of the Invention

Broadly this invention relates to computers and operator interfaces. More particularly, this invention relates to the field of interaction between a class of microprocessor-based machines including computers and consumer electronics, and operator(s) of these microprocessor-based machines during the times of operator-machine latency.

2. Description of the Related Art

The field of computers and operator interfaces continues to develop. The typical components of a personal computer will be briefly reviewed. FIG. 2 is a block diagram of the principal components of a personal computer (PC) 200. The PC's processing is controlled by a central processing unit (CPU) 203. The CPU 203 receives its electrical power from a power supply 205 and its performance is at least in part determined by the speed of a clocking 207. The CPU 203 must control the data and process it as it is passed from the input/output controller 215 and the memory controller 209. The memory controller interfaces between the dynamic random access memory (DRAM) 213 and the read only memory (ROM) 211. The input/output controller 215 interfaces with a feature bus 217. On a feature bus there may be any type of optional non-volatile data storage, optional communication device, or optional processing control devices. The non-volatile types of storage are either non-removable such as a hard disk drive 223, or removable such as a PCMCIA card or smart card port 225 (credit card size cards), removable media drive 221 which accepts such media as a floppy disk 245 CD (compact disks), Zip™ disks, or in fact any type or kind of removable media. Optional high speed communication with a PC is accomplished using wired ports such as a serial or parallel port 227, or an universal serial bus (USB) 231 or local area network (LAN) connection 233. Optional wireless communication with the PC 200 is accomplished by such ports as an infra-red data attached (IRDA) port 229. The operator receives real time processing results from the multimedia Interface 235, which are the combinations of the PC display and the speaker(s). The operator controls the PC by a Keyboard and mouse 219. This entire system known as a hardware platform 237 must work in cooperation with a PC operating system 239. Operating systems include Microsoft Windows NT, Apple System 7, IBM OS/2, or equivalent. Application software 243 is any program designed to run on a PC operating system 239. In addition, the application software stores on the Hard Disk Drive certain files or messages 241 such as the operating system 239 start and stop screens.

The operations of the principal components of the hardware platform 237, operating system 239 and applications software 243 are well known. The cold boot-up of a PC such as PC hardware platform 237 is known. It should be understood that the principal components of the PC 200 are not limited to any specific hardware platform 237 or specific operating system 239 or specific application 243. The PC 200 can be implemented in a wide a variety of hardware, operating system or software within the true scope and spirit of the present invention.

A variety of applications 243 can run on the PC hardware platform 237. One example application is a word processing program. If the PC is used for word processing, the user enters text. Thereafter, changes and improvements are made and printed very easily without re-typing the entire document. However, the user must wait for this printing. There are other examples of PC applications including spreadsheets that speed up accounting, and database programs that track data and graphic programs that ease and improve presentation and publishing. In all cases there are times of waiting, be it during the start of the application, printing, calculations, file management, communication with other devices and other microprocessor-based events.

Many people would argue that as PC technology continues to improve the hardware and software, the operations will be faster and there will be less waiting, however as most of the PC marketplace upgraded from DOS, to Windows 3.x, to Windows 95 operating systems, the waiting became even longer. The simple operation of turning starting-up or shutting-down the PC 200 can take several minutes each day.

FIG. 3 illustrates a flow diagram of the PC of FIG. 2 during a cold start-up or boot-up 300. During this start-up flow, the PC user is waiting for the machine to finish the start-up flow of FIG. 3. This wait time for a cold start up can take several minutes. The flow diagram begins with step 301, wherein the user decides to start the PC from a completely powered off state. The power is turned on and a self-test and BIOS software routines are completed 303. Then the operating system "start screen" graphic, is displayed on the screen 305. An example "Start Screen" or "Splash Screen" is well known Microsoft Windows 95 banner. FIG. 4 contains an example of this. The PC operator must wait for the completion of the loading of the operating system 307, during this time the operator is viewing FIG. 4. Finally the "Start" screen is replaced with the PC's "Desk Top" 309. The user is provided only the status of the PC starting and no other additional information to inform, to entertain or to educate the user during this start-up process. Accordingly a need exists to provide a PC user during startup additional information.

During a shutdown of a PC, a similar scenario happens. When the operator decides to turn off the PC, such as preformed in Windows 95 or Windows NT, the operator clicks on "Start" then "Shut-down". Then the operator views a screen such as that shown in FIG. 5, which contains the Windows shut-down screen, during the shut down of the operating system. The time period for shut down can range from several seconds to a minute depending on the hardware platform 237 and associated operating system 239. The user is provided information only on the status of the shutdown process. No other information is provided, therefore it would be desirable to better utilize the time spent during shut down.

FIG. 6 illustrates the principal components of a TV 600. The operation of a TV is well understood. The TV's electronics 603 is almost completely analog mixed signals however modern TV's have such functions as picture in a picture and in fact in the future will be converted totally to digital with the up coming High Definition Television (HDTV). The TV has an electrical power supply 617. The TV has a video display 605. The TV provides for audio with one or more speakers 607. The TV has a TV control unit 609, which is the TV channel selector, volume, and other user settings. The TV must receive a signal, which may real time (live) broadcasts from an antenna, cable, or satellite 611. Alternatively the TV may have a pre-recorded input from a VCR or digital video disk (DVD) 613 input. Finally the TV may have an optional remote control 615.

When a TV is powered on there is a brief wait as the TV's electronics and display tube heats up and the picture comes into focus. During this time the TV operator is waiting for confirmation that the TV is displaying the desired program. Once the TV is viewed to be on by the operator, there may be additional waiting if the user then selects a pay-per-view TV program. This wait can take thirty seconds to a minute. The user is presented no additional information, to entertain or to educate them, accordingly a need exists to provide TV users during idle time additional information.

FIG. 7 illustrates the principal components of a telephone 700. The phone electronics 701 sends and receives information from the antenna or wire connection 703. This information is decoded from an analog or digital signal, and presented to a speaker 705, and gathered from a microphone 707. The key pad 709 is used to "dial" and for interfacing with the phone. The power is supplied from the wired connection or for the wireless phone the power is from a battery 711. Finally most phones have a display 713 for visual presentation of information. When a call is placed there is a minor wait as the call is being routed. The time to connection is largely based on the number of public telephone switches the call must be routed through, combined with how long the person being called takes to pick up the receiver. This time may be several seconds to a minute. The caller has little to do but to wait for the called phone to be answered. No other information is provided. Therefore a need exists to provide the caller additional information, during idle time, to inform, to entertain or to educate the caller.

FIG. 8 illustrates the major components of a microprocessor-based appliance. Today, electronic appliances are very sophisticated. Appliances not only save time and money but provide convenience to the operators of these appliances. Examples are radio receivers, microwave ovens, audio and video players such as CD players, ATMs (Automated Teller Machines) and a gasoline pump with a pay at the pump credit card reader. In all cases these appliances are under the control of a microprocessor. The microprocessor is directed by the appliance operator. Referring to FIG. 8, the microprocessor and electronics 801 receive commands from the appliance operator through the controls 807. The microprocessor and electronics 801 may send and/or receive information from optional communications 803. Other electronic appliances are product dispenser machines including vending machines, ticket machines and any other electronic machines used by the public to provide a product. The product dispenser machine generally prompts a user or operator for a PIN (Personal Identification Number) and a credit card or bank card or equivalent. The product dispenser communicates the PIN and the card authorization. The CD, DVD player and microwave may not have any communication capability. However note that it is common for a CD player to be integrated with a radio. This entire unit is powered by the power supply 811. During the request for service from the microprocessor the operator interacts with the appliance using the speaker and display 805. Typically the appliance is programmed to interact with a user through the product interface 809. The appliance may be to tune a receiver to a given station 813. It may be to program the microwave oven to a given cook time and power 815, to play songs in a particular order from the CD player 817, or it may be to receive a certain amount of money or gas from a product dispenser 819. These examples are given to illustrate a common and very wide based microprocessor-based appliance and appliance-operator interaction. In all of these different cases the operator programs the appliance and then must wait for the intended result. In the case of the receiver, during power-on and station selection there is a wait time. In the case of a microwave oven cooking food, for example popcorn, the user waits for 2 to 4 minutes. During the process of powering-on a CD or DVD player, and selecting the desired song or movie, the operator must wait. Certainly once, an ATM user selects a certain amount of money to be dispensed, the user will wait for the money to be dispensed. Therefore a need exists to provide the appliance operator, during idle time, additional information to inform, to entertain or to educate the appliance operator.

Shown in FIG. 9 are the principal components of a communication enterprise 900 such as a network, the Internet, the World-Wide-Web or equivalent. PCs have enabled the compression and storage of huge quantities of data that are "tagged" and search-able. Communication companies have enabled high-speed inexpensive communication of this data, from anywhere to anyone at any time. One needs only request selected information, and the network will deliver it. However, many times the speed of sending the answer back to the user is slow. As the images and graphics grow more data intensive the transmission, decompression and display takes longer.

FIG. 9 is a high level description of an LAN, (local area network) an Intranet, Internet, Extranet, a WAN (Wide Area Network), and in fact any plurality of microprocessor based communication devices. It will be noted that these connections may be wired or wireless or any combination thereof. The common concept here is that there is a communication fabric 903 to communicate with microprocessor based devices, within which certain standards and protocols are defined and adhered to so as to effect the communications required. This enables the microprocessor-based client 901 to request certain information by communicating through the fabric to the microprocessor-based server 905. Although the Internet and the World Wide Web are the best known example of this, the fundamentals of these communication enterprises apply to networked devices.

FIG. 10 illustrates an flow diagram of a Internet or Intranet dial-up and Logon process 1000. At no time is waiting more important then at the start of an Internet dial-up. One must wait for the computer to make a connection to an Internet service provider (ISP), to verify the password and finally to "make the connection". This dial-up process can take 30 seconds to several minutes depending on many factors including modem speed, available network utilization and available bandwidth and the server availability of a desired server. Therefore a need exists to provide the appliance operator, during idle time, additional information to inform, to entertain or to educate the operator. The PC operator 1025 selects the icon to start the connection process and if required inputs the password 1003. Now processor initiates the connection process 1005. This connection could be wired: a dial up modem, a cable modem, a wired local area network (LAN) or wireless: satellite, wireless modem, microwave, or any other type of wired or wireless connection. In any case a "logical" connection is sought. At this point in time the operator 1025 is put into a wait mode 1021, while the processor and the network accomplish the task of connection. If the connection is not made 1009 the computer may re-dial several reprogrammed times 1007. Once the connection is completed the password and certain other information is sent, such as the connection speed. The service provider receives the password and checks for validity 1011. If the password is not valid, the operator is asked to retry 1013. If the password is valid than a connection is granted 1015. Now typically the operators pre-programmed home or first page of information is sent and rendered 1017. Only now is the operator completed waiting and there is something else, other than "connecting status" displayed on the screen 1023. At this point in time the operator has a normal Internet or Intranet session 1019. The connecting status allows the PC operator to be aware of the progress and status of the connecting process. The major steps are: dialing, connecting, verifying the password, making a network connection and finally connected and the end of the wait for the operator.

There are application software solutions such as Point Cast™ and BackWeb™ that will display information that has been aggregated. The PC offers a list or menu to the user for down loading and viewing during their Internet session. Taken together, Point Cast™ and Back Web™ offer what is know as push technology. The user subscribes to certain information, and then receives this information during time periods when the PC is connected to a host. The downloaded information, is selected from a list of information and news. It is important to understand that the user has the final say in what is displayed from a list of preferences. In addition there is no user location, or user time of day tuning for this information. Within the Internet there are E-mail products that are offered to Internet operators at no charge. These products are allowed to send, receive and compose E-mail when connected to the Internet from anyone's computer. In addition a user's mail is stored in a server that is provided by the this E-mail company. The way that the E-mail provider can pay for this E-mail service is for advertisers to pay for ad space which is viewed during the users E-mail session. Examples of these E-mail products are HotMail™ from Microsoft and Yahoo Mail from Yahoo!™.

In all of these illustrative examples, the operator (or user) of a processor is waiting for the completion of a process. Waiting is a relative measurement of time. For example, the wait for a connection to the Internet the first time may seem short. But after daily usage this time seems very long. The time is the same, the perception and familiarity of the waiting is the real issue. Yet another issue is the aggregated waiting time between operators and processors. Considering only the Internet for example, there are about 50 million users in the U.S. on the Internet daily, who wait about 30 seconds each and every time. This waiting results in 47 years of aggregated waiting, each and every day. Accordingly a need exists to overcome the problems noted above by providing a user of a dial-up networking service additional information to educate, to entertain, and to amuse, a user while waiting for the dial-up connection to complete.

The use of a microprocessor, or controller or information processing system is used to save time, labor, money or to improve the quality of the product or service. The use of microprocessor-based systems has presented the user with a problem. The user is waiting for the end of the process that was initiated by the user to complete. User perception is important during times of waiting. For example; when elevators were first introduced, the time, and effort of climbing the stairs of high rise buildings were replaced by the comfort and time saving ride up or down in an elevator. However once in place the elevator users (operators) had complaints about the speed of the service. The users must wait for the elevator to arrive at the floor of the user. The elevator solution, had a problem. The owners of the elevators wanted to solve the perception of the long wait for the elevator ride. The solution was for the elevator owners to installed mirrors around the doors. The perception was that the speed of service of the elevators had improved. In reality, the wait time for the elevator was the same. What had changed was that the elevator user (operator) was using the mirror to look at themselves or at others during the wait for the elevator. Therefore, a need exists to modify a user's perception of waiting for a user initiated task to complete by presenting additional information.

SUMMARY OF THE INVENTION

Briefly, in accordance with the present invention, disclosed is a method and apparatus that address the wait-time between an operator and a processing machine by providing the user information during waiting periods. The operator determines that there is a need for a process, the operator starts the process and then during the processing the operator is waiting. This wait time or latency is such times as: while the operator is waiting for a processing device such as a personal computer (PC) or wireless entertainment device; while the processor is waiting for an operation to be completed (such as dialing onto a network); while the processor is waiting for a new command from the operator. The operator may need to check if the process is complete, and when the process is complete the operator determines if the need was fulfilled. These wait-times will be used for rendering information and interacting with the information. This information, which may be multimedia, contains educational and/or entertainment information in addition to the status of the process the operator is waiting to complete.

BRIEF DESCRIPTION OF THE DRAWINGS

FIG. 19 is an example illustration of a full page message for flow diagram in FIG. 16 according to the present invention.

DETAILED DESCRIPTION OF AN EMBODIMENT

The term informational message is used throughout this specification. The term refers to a message that is not necessarily related to the processing being done but is of general interest. An informational message can be any multimedia message. Messages include advertisement, amusements (such as a joke of the day) or educational messages.

A microprocessor has available to it information that can be a diversion to "speed up" the users waits for the completion of a user-initiated process. These microprocessors can be used to perform concurrent or co-terminous processes. Once this is understood, it is also to be understood that the information that will be presented during the wait can be tuned to the specifics of the user.

Figure 11:
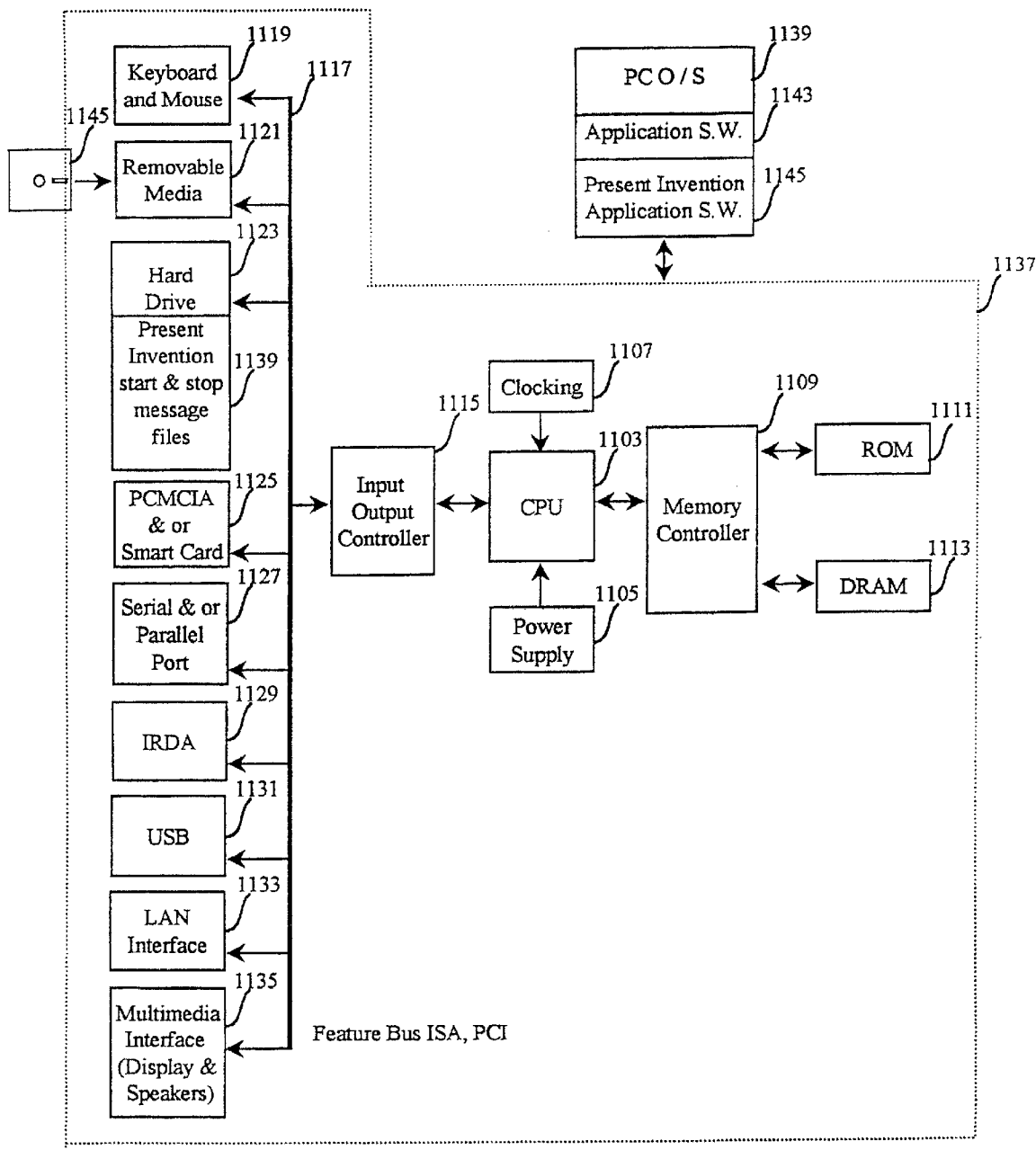
FIG. 11 is a block diagram the PC of FIG. 1 with the application program according to the present invention.

FIG. 11 illustrates a block diagram of the principal components of a personal computer (PC) 1100 in accordance with one embodiment of the invention. The PC's processing is done by a central processing unit (CPU) 1103. The CPU receives its electrical power from the power supply 1105 and its performance is determined by the speed of a clock 1107. The CPU must control the data and process it when it is received from an input and output controller 1115 and a memory controller 1109. The memory controller interfaces between a dynamic random access memory (DRAM) 1113 and a read only memory (ROM) 1111. The input/output controller interfaces with a feature bus 1117. On the feature bus 1117 there may be any type of optional non-volatile data storage, optional communication device, or optional processing control devices. The non-volatile types of storage are non-removable such as a Hard Disk Drive 1123, or removable such as a PCMCIA card or a smart card port 1125 (credit card size cards), removable media which accepts such media as floppy disks, CD (compact disks), Zip™ disks, or in fact any type or kind of removable media 1121. Optional high speed communications with the PC 1100 is accomplished using wired ports such as a serial or parallel port 1127, or a universal serial bus (USB) 1131 or a local area network (LAN) connection 1133. Optional wireless communication with the PC 1100 is accomplished by such ports as an infra-red data attached (IRDA) port 1129. The operator receives real time processing results from a multi-media Interface 1135, which are the combinations of the PC display and the speaker(s). The operator controls the PC by a keyboard and mouse 1119. This entire system known as a Hardware Platform 1137 must work in cooperation with a PC operations system 1139. operating systems include Microsoft Windows NT, Apple System 7, IBM OS 2, or equivalent. Application software is any program designed to run on a PC operating system 1143.

Note that the application software stores on the Hard Disk Drive 1125 certain files or messages 1139 such as the operating system 1139 start and stop screens. The present invention resides as one of the application software solutions 1145.

Figure 1:
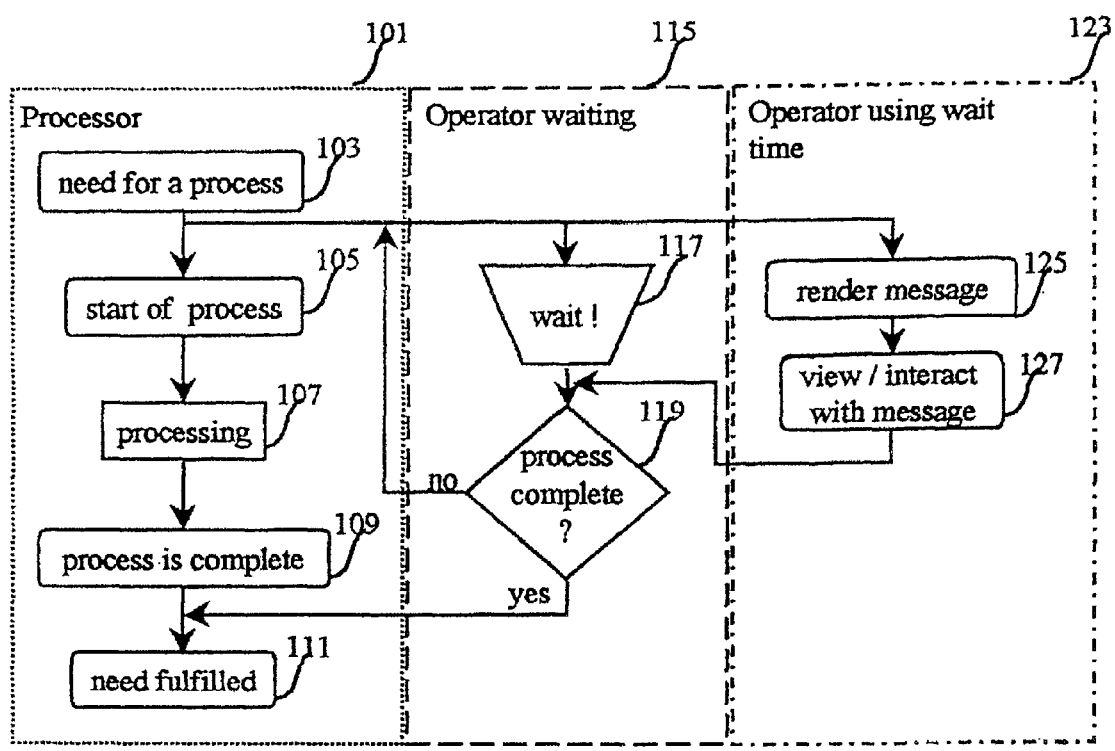
FIG. 1 is a block diagram illustrating an over view of a processing event illustrating operator-machine latency according to the present invention.
Figure 2:
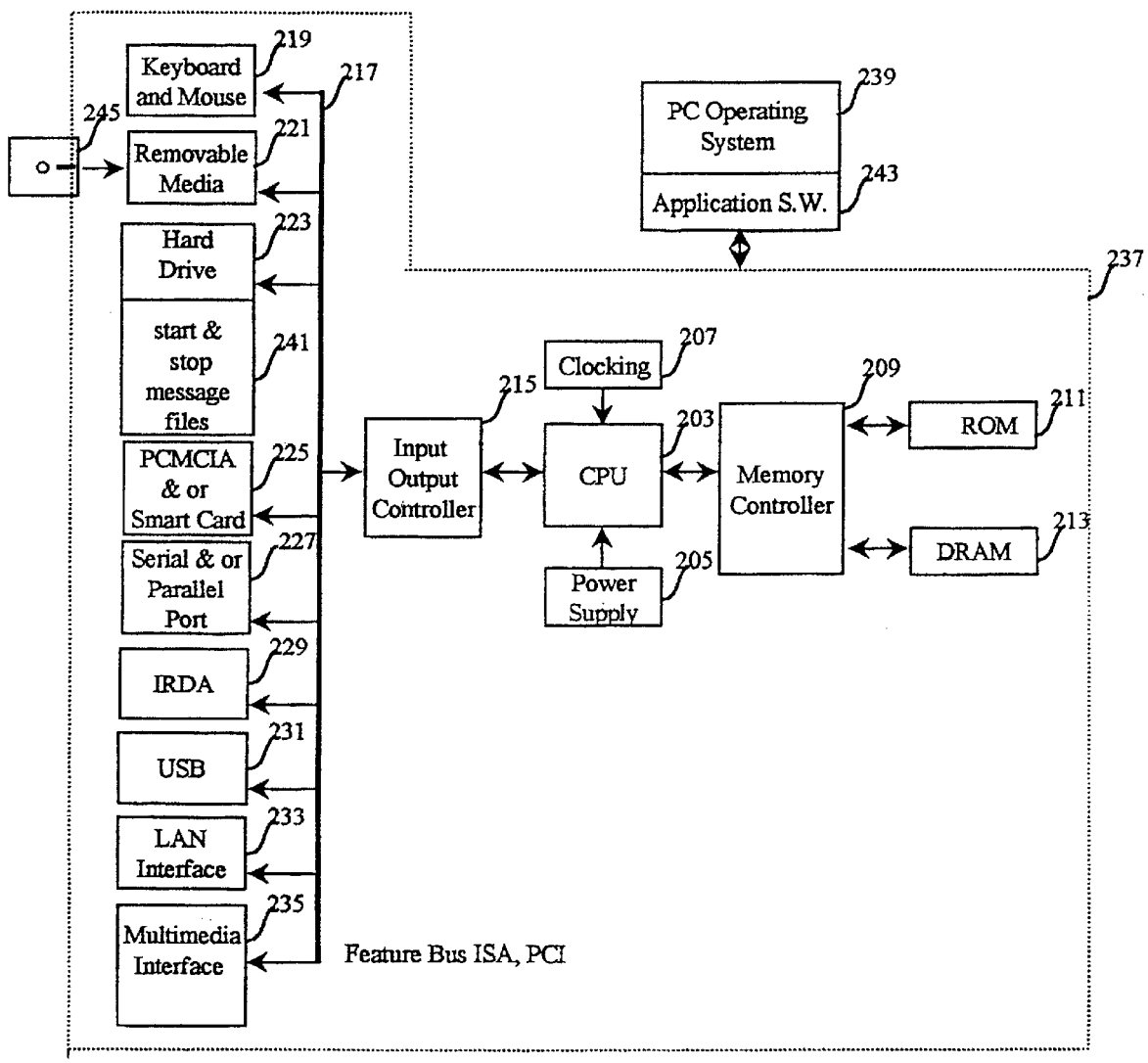
FIG. 2 is a block diagram of the principal components of a PC.
Figure 3:
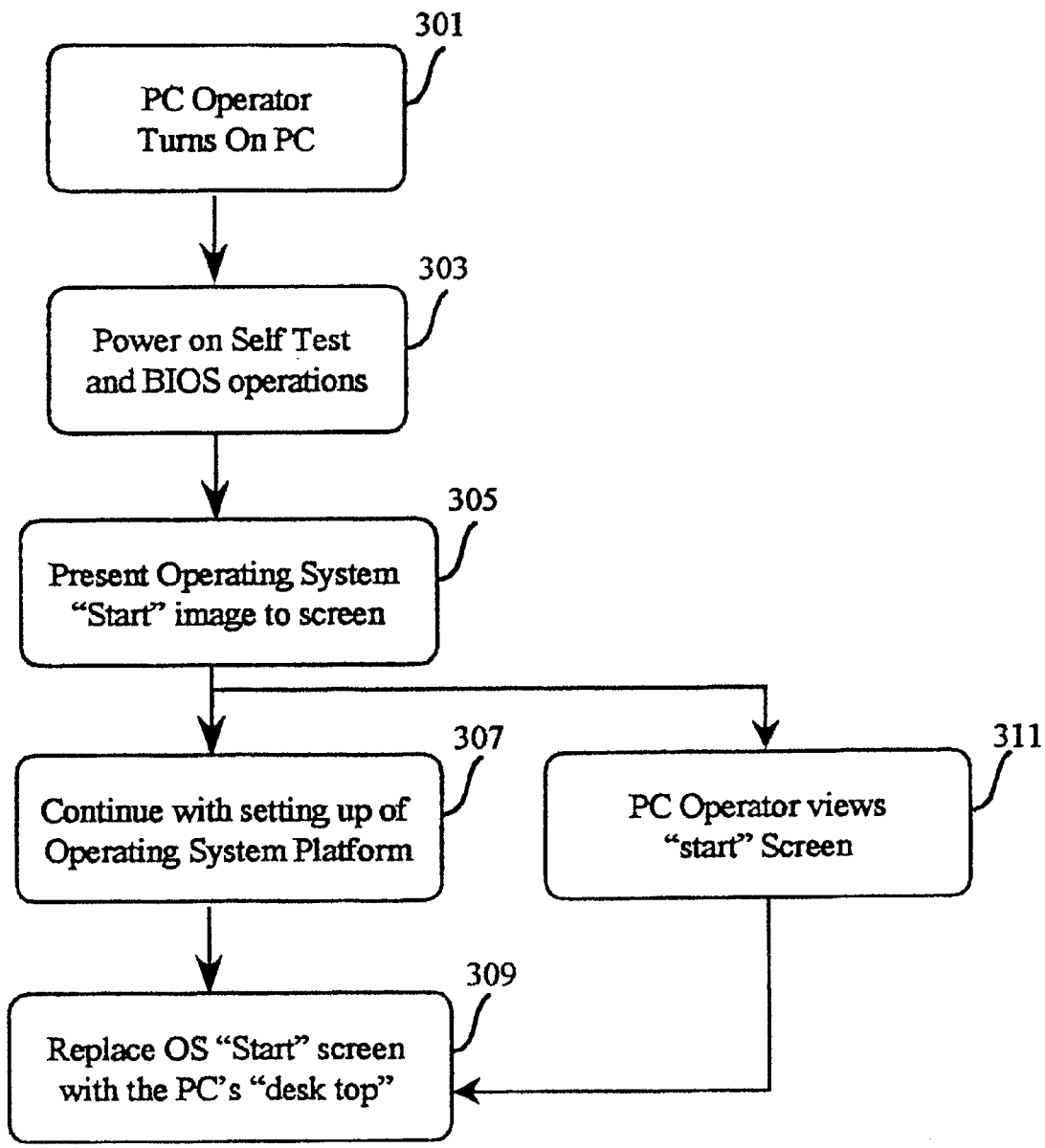
FIG. 3 is a flow diagram of the PC of FIG. 2 during a cold start-up.
Figure 4:
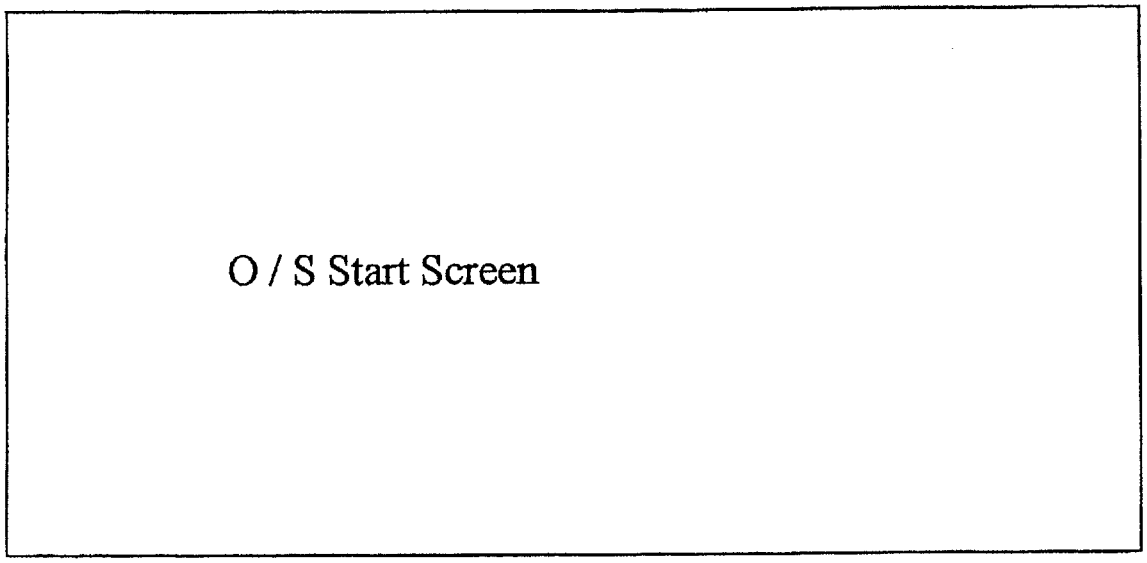
FIG. 4 is an illustration of a PC start screen message for Windows 95 during the cold start-up process in the flow diagram of FIG. 3.
Figure 5:
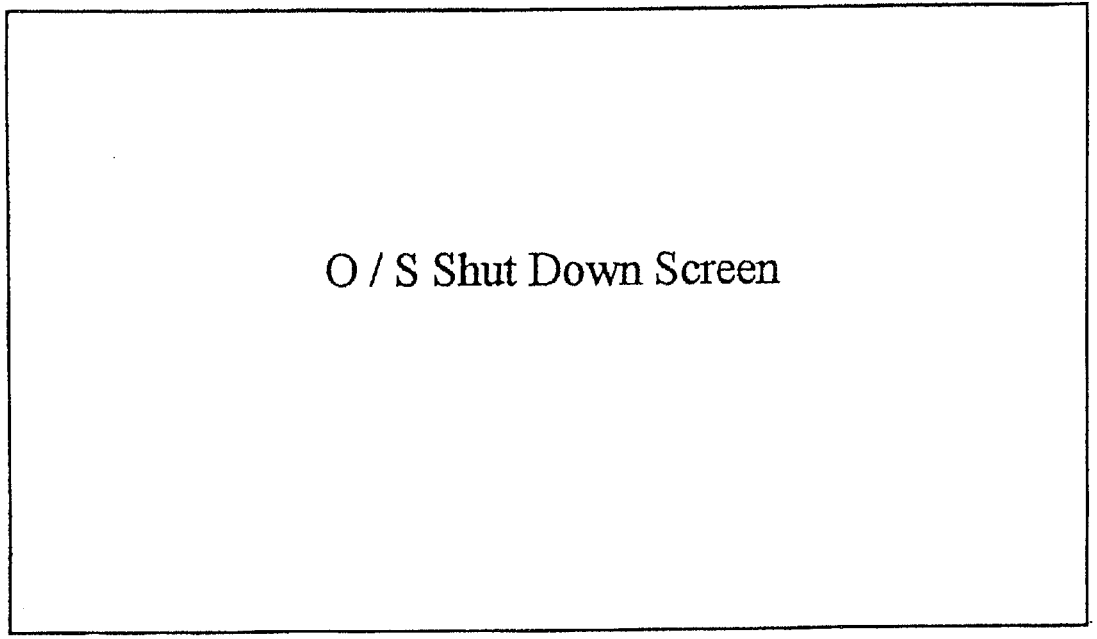
FIG. 5 is an illustration of a PC shutdown screen message for Windows 95.
Figure 6:
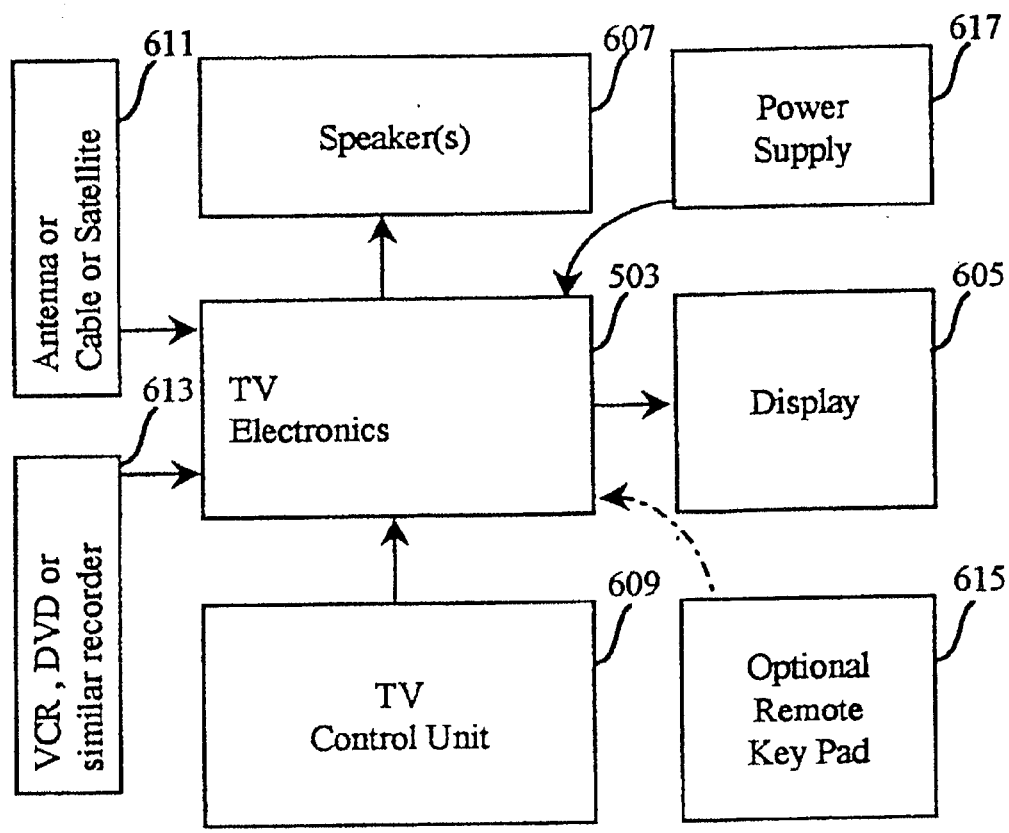
FIG. 6 is a block diagram of the principal components of a T.V.
Figure 7:
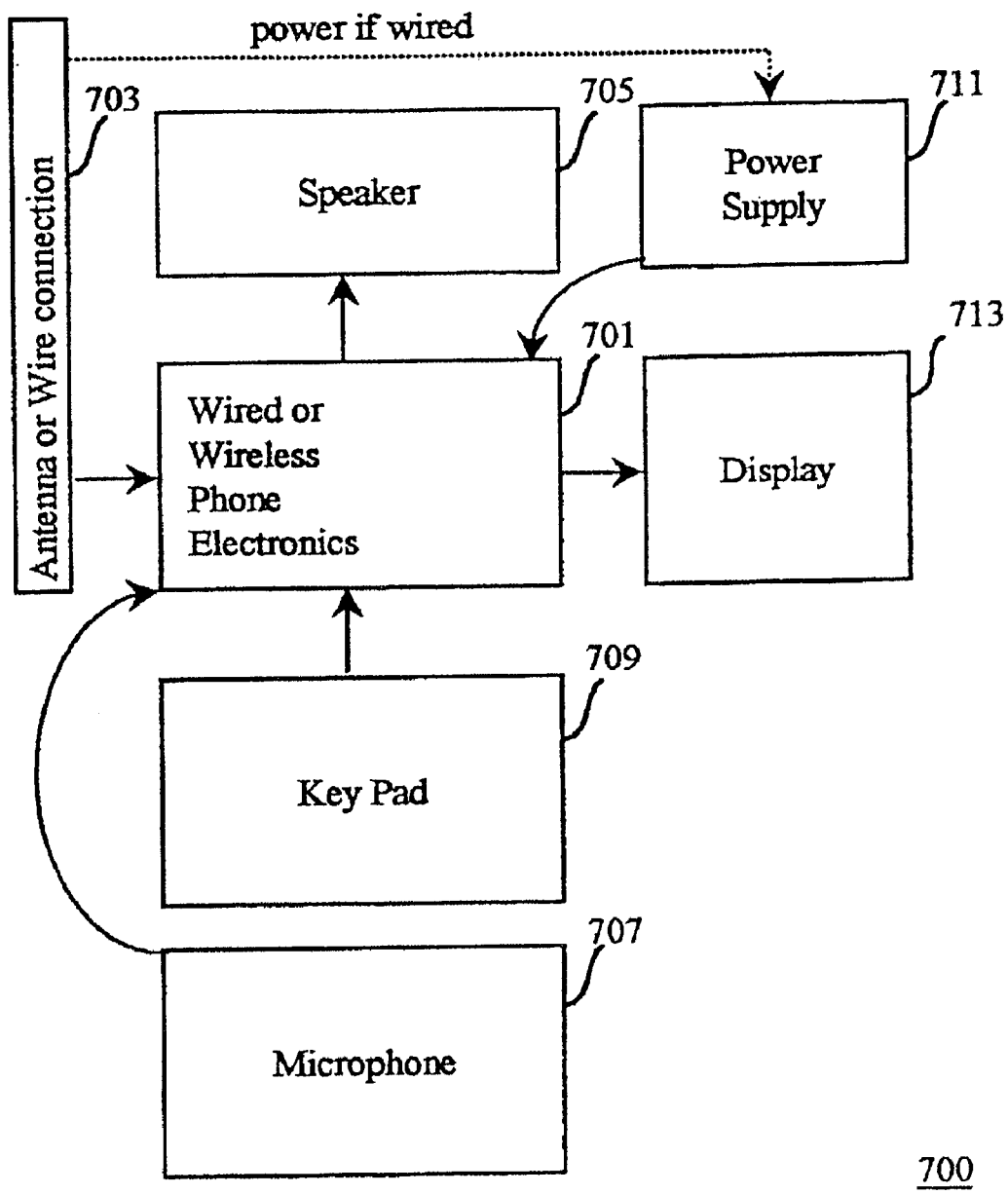
FIG. 7 is a block diagram of the principal components of a phone.
Figure 8:
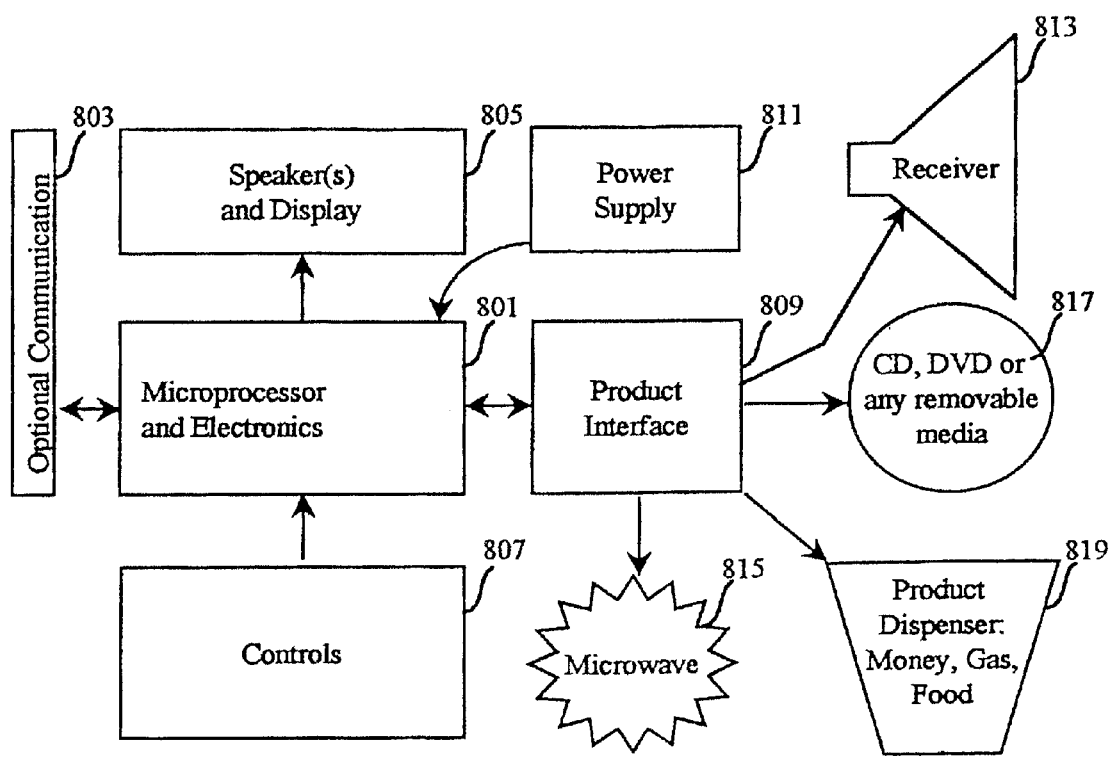
FIG. 8 is a block diagram of a microprocessor-based appliance.
Figure 9:
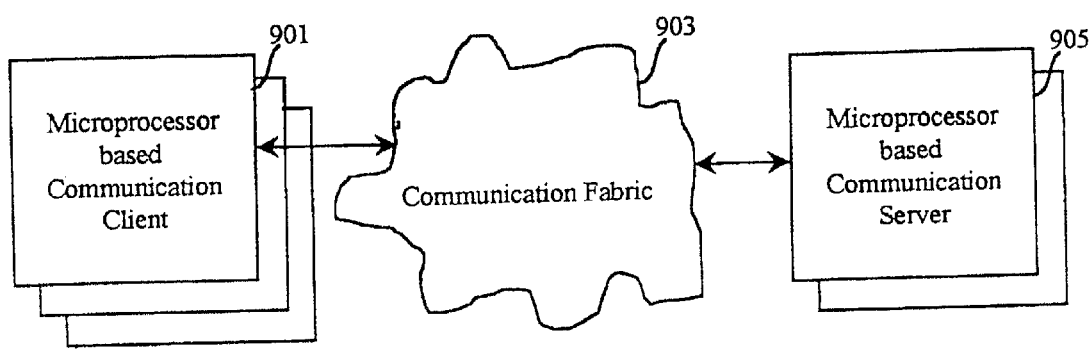
FIG. 9 is a block diagram of the principal components of a communication system according to the present invention.
Figure 10:
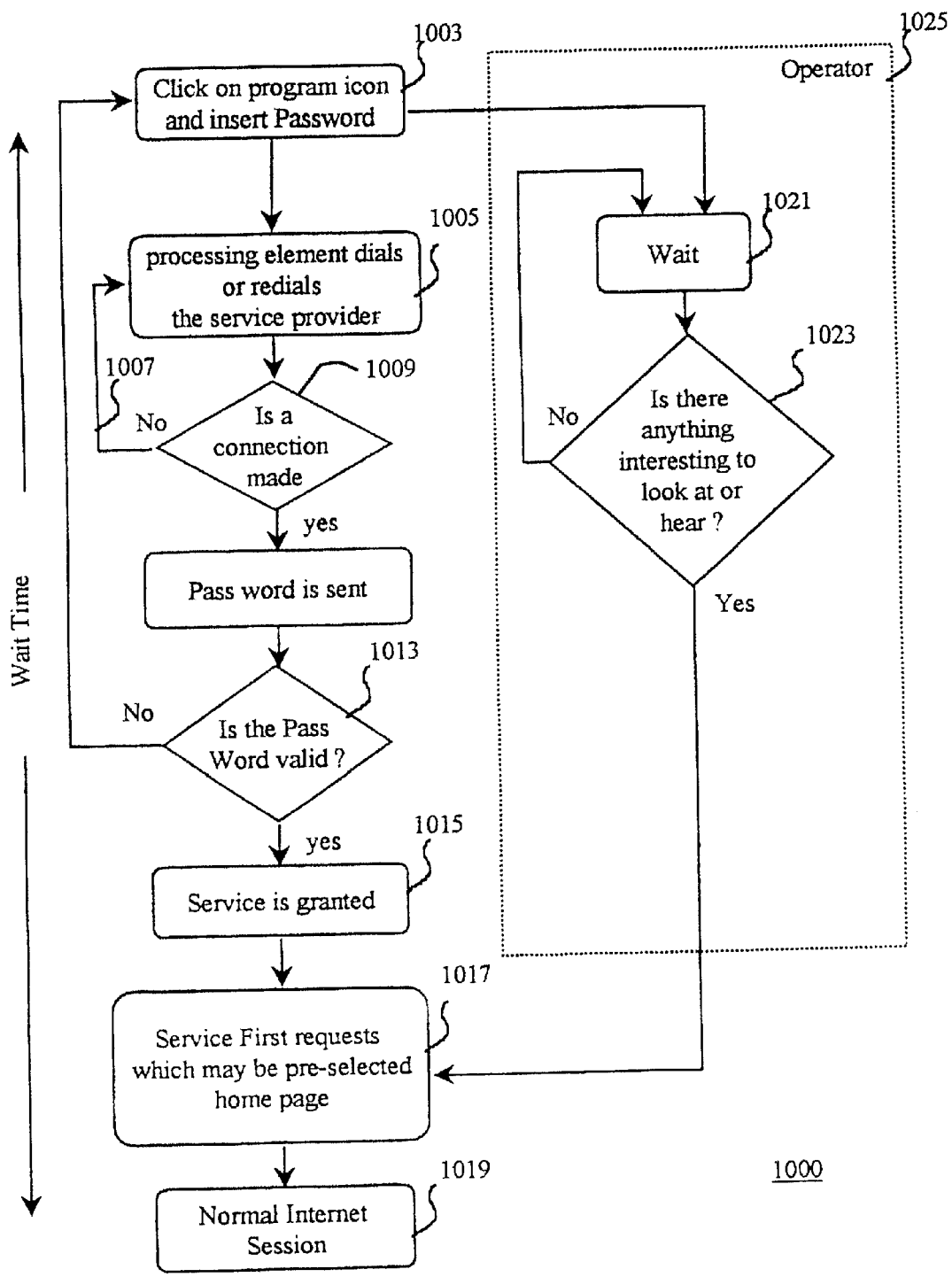
FIG. 10 is a flow diagram of an Internet or Intranet dial-up/Logon connection according to the present invention.
Figure 12:
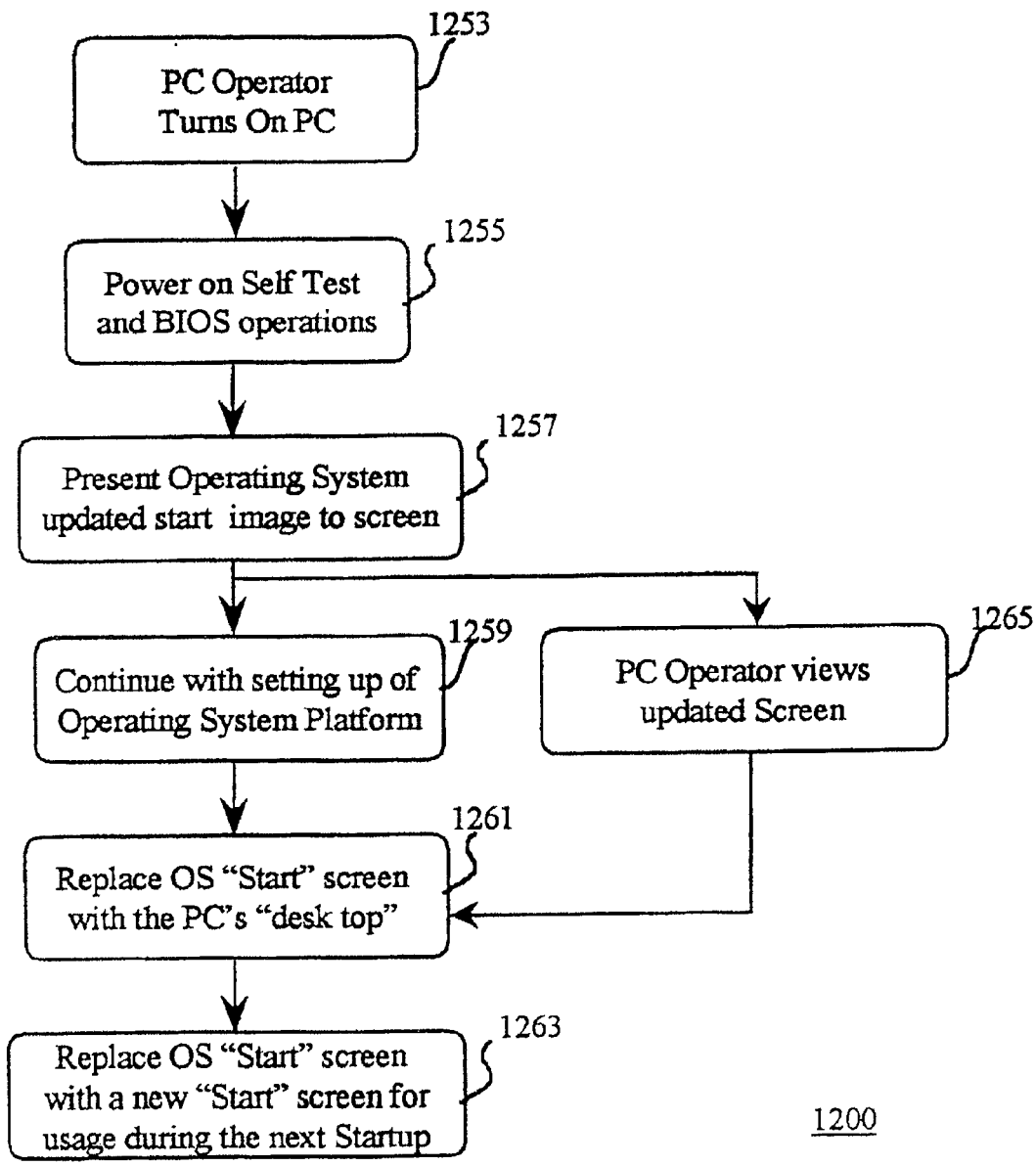
FIG. 12 is a flow diagram of an operating system with a start screen of the PC in FIG. 11 according to the present invention.

FIG. 12 is the flow diagram of the present invention with the PC operating system 1139 running on a PC hardware platform 1137 as described in FIG. 11. The PC is turned on by the PC operator 1253. The PC accomplishes the power on self-test and BIOS operations 1255 which is known to those skilled in the art. The operating system 1239 renders the "Start Screen" to the monitor, such as the Windows 95 banner 1239 as illustrated in FIG. 4, which has been stored during the previous power cycle 1257. The operating system 1239 continues to set up the operating system platform 1259. During this time the operator views the "new" start screen 1265. The viewing is complete after the start screen is replaced with the desk top 1261. Once the operating system is set up the PC operator uses the PC in the usual way. The Hard Disk Drive 1123, at a certain address, has the operating system start and shutdown screen images 1139 of FIG. 11. These images are replaced by the present invention software during the previous PC session. The images are sought by the present invention software from any previously agreed to source. For example during an Internet session the ISP 905 provides new images which are written to the certain locations in the PC's Hard Disk Drive 1139 of FIG. 11, which will be presented during the next PC power cycle. The replacement of certain files by the ISP during an Internet session is called updating. The method and means for accomplishing this is understood by those skilled in the art. This allows for the operating system's start and shutdown screens to be new, updated or fresh and of interest to the PC operator. Using the present invention the PC system 1100 can store into the location of this screen image an updated image. Therefore each time the user turns on or off the machine a new image is presented. The intent and usage of these screens may be educational or for commerce such as advertisements or in fact for simple amusements such as a joke of the day.

A similar method described for the PC 1100 start screen 1265 can be used for the PC operating system shutdown screen. Moreover, certain standard screens, such as the PC desk top screen, in fact any and all "standard" screens that are presented to the PC operator during times of waiting can be replaced, kept updated and current. All standard wait screens or dialog boxes can benefit from the present invention. For example, several application software programs present a "tip of the day" dialog box, e.g. Window 95, Microsoft Word, Lotus WordPro, just to name a few. This "tip of the day" dialog box can be replaced by newly down loaded messages. During the printing of very large graphic files the printing dialog boxes can be replaced by a screen that contains messages that may be related to printer products and related interests. Screen saver screens which are activated by the operating system after a time of inactivity by the PC operator, can be updated and therefore of use to the PC operator during the waiting and be tailored for the time of the day, week, season that the screen saver is being rendered. A more detailed explanation of filtering is discussed in FIG. 21 below.

Figure 13:
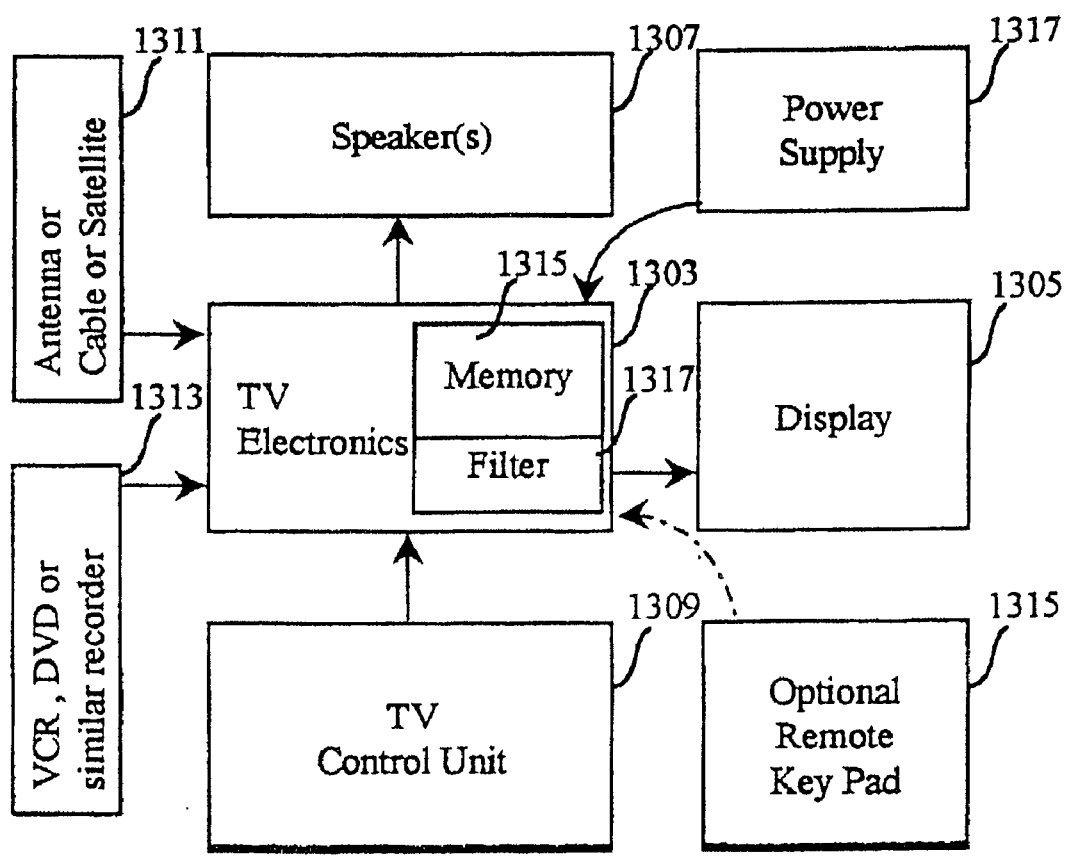
FIG. 13 is a block diagram of the principal components of a T.V. according to the present invention.

FIG. 13 illustrates the principal components of a TV 1300 according to the present invention. The operation of a TV is well understood. The TV electronics 1303 is almost completely analog mixed signals, and will in the future will be converted totally to digital with the up coming High Definition Television (HDTV). The TV has an electrical power supply 1317. The TV has a video display 1305. The TV provides for audio with one or more speakers 1307. The TV has a TV controls unit 1309, which is the TV channel selector, volume, and other user settings. The TV must receive a signal, which may real time (live) broadcasts from an antenna, cable, or satellite 1311. Alternatively the TV may have a pre-recorded input from a VCR or Digital Video Disk (DVD) 1313 input. Finally the TV may have an optional remote control 1315. The memory 1315 and an apparatus for choosing which TV image to display upon being turned on is connected to TV electronics 1303. The amount of memory can be small in the order of (640×480×3 Bytes) 921,600 bytes. This is simply illustrated here as a filter for messages 1317. Using known methods, one skilled in the art can combine the proper attributes the images that were stored in the memory 1315 allow the filter 1317 to select a particular TV start screen based on certain methods and techniques that will maximize the revenue for the provider of the information. These methods are but not limited to: the time of day the TV is turned on, the location of the TV, the currently selected TV channel which in which the image can be tailored to market demographics associated with the channel. Further details on the filtering methods are described in FIG. 21 below.

During the normal viewing of TV certain multimedia messages were stored in the memory 1315 for usage by the filter during the next power cycle. The content of the message may be a static screen, a video or only an audio clip. These messages may be sent using VBI (Vertical Blanking Interval), Intercast (a product from Intel that requires a PC in addition to a TV), DVB-2 (Digital Video Broadcast-2) or any equivalent technology. It is also understood that these messages may be sent using "other" technologies such as the telephone based Internet, FM radio, or in fact the messages may be sent in bulk on a DVD player to be accessed using the filtering methods discussed in FIG. 21.

Now when this TV is turned on the TV operator will experience a first message. The duration of this first message even if it is short, such as a few seconds, will allow the TV user to view the message, that will be of interest, based on the users location, time of day and viewing habits.

Figure 14:
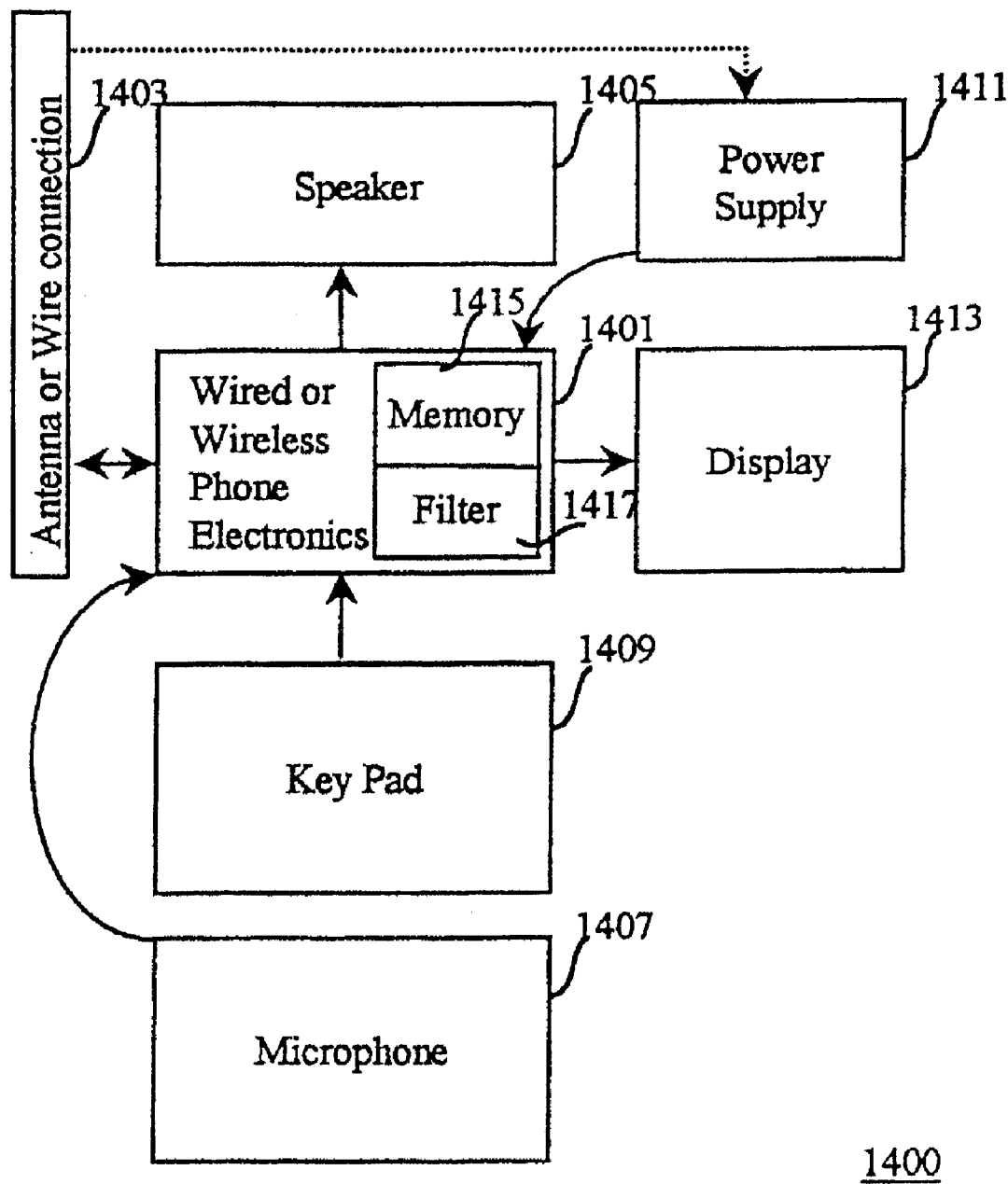
FIG. 14 is a block diagram of a phone according to the present invention.

FIG. 14 illustrates the principal components of a phone according to the present invention 1400. The telephone electronics 1401 sends and receives information from the antenna or wire connection 1403 gathers the two phone users' voices to be transmitted over the phone's electronics 1401. This information is decoded (analog or digital) and presented to the speaker 1405 and microphone 1407. The key pad 1409 is used to "dial" and for interfacing through the phone. The power is supplied from the wired connection or for the wireless phone the power is from the battery 1411, and a display 1413 for visual presentation of information. The memory block 1115 and the filter block 1417 are electrically coupled to electronics 1401. This phone can now render, display or announce with audio, information that has been selected for this geographic location. The location can be as general as the area that is covered by a cell tower, or as specific as a caller ID. The message is based on the time of year, day of week, and time of day. In an alternate embodiment, the message is keyed to the user's pre-selected interest. The message is sent to the phone and stored in the memory block 1415, for usage immediately or in the future based on the filter block 1417. Therefore during the waiting for connection or after the call has been completed the present invention provides for rendering information that will inform, entertain and educate. The information is sent and stored in the phone during the times of user inactivity. These times are during the ringing for the called phone to pick up, during the pausing and silence during the normal conversation, and in fact can even be encoded and coupled onto the voice signal during the spoken conversation. The information can be presented on display 1413 as a visual message or mixed into speaker 1405 as an audio message or a combination of both.

Figure 15:
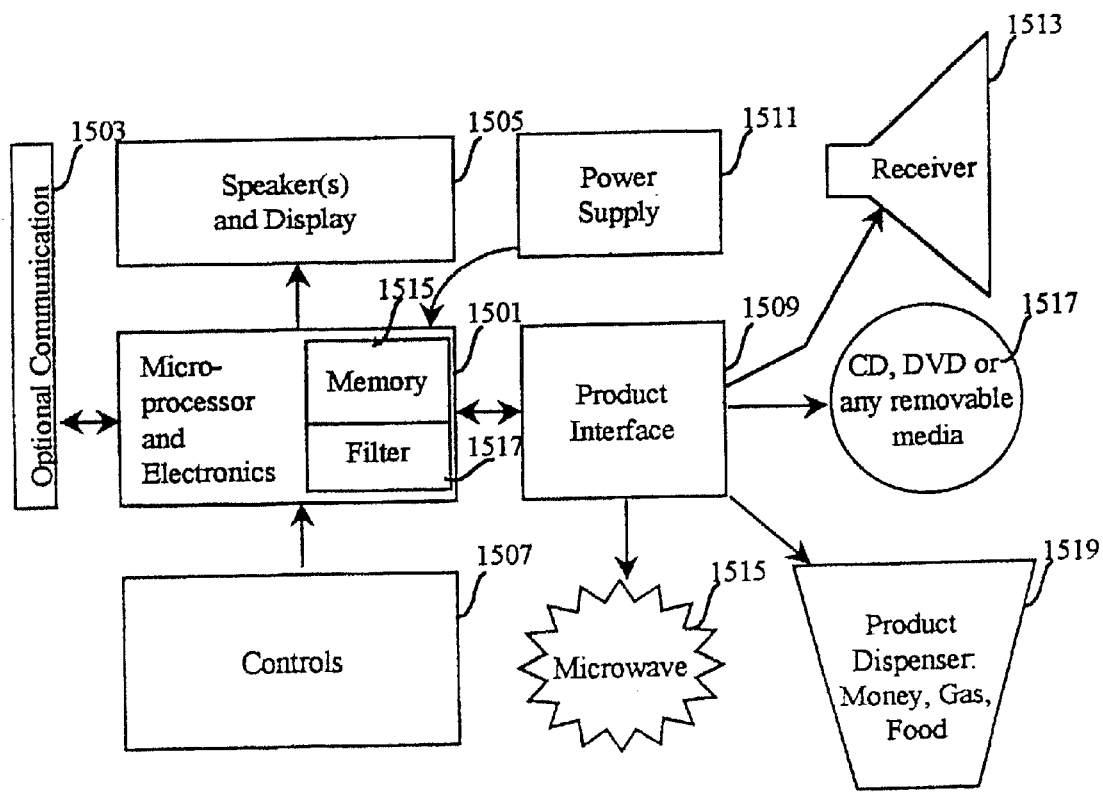
FIG. 15 is a block diagram of a microprocessor-based appliance according to the present invention.

Shown in FIG. 15 are the major components of a microprocessor-based appliance according to the present invention 1500. The microprocessor and electronics 1501 receive commands from the appliance operator through the Controls 1507. The microprocessor and electronics 1501 also sends and/or receives information from optional communications 1503. In the case of a receiver this is simply the station that the receiver is tuned to. In the case of the product dispenser the communication is for PIN and money card authorization. The CD, DVD player and microwave may not have any communication. However note that it is common for a CD player to be part of a radio. This entire unit is powered by the Power Supply 1511. During the request for service from the microprocessor the operator interacts with the appliance using the Speaker and Display 1505. Once the appliance is programmed the microprocessor and electronics interacts with the Product Interface 1509. This may be to tune a receiver to a given station 1513, it may be to program the microwave to a given cook time and power 1515, it may be to control the turn table to play songs in a particular order from the CD player 1517, or it may be to receive a certain amount of money or gas from a product dispenser 1519. With the addition of the memory block 1515 and the filter block 1517 the microprocessor base appliance can now render (display or announce with audio) information that has been selected for this location, time of day, and user's preference.

The present invention will be applied to today appliances so as to render information that will inform, entertain and educate during the waiting times. Examples are a while turning on a receiver a brief audio message is given. When micro-waving popcorn a message is rendered which may be an audio message or a displayed image. Audio or video player can render messages during startup and user selection. During the wait for money an ATM (Automated Teller Machine) a tuned message may be rendered. The users are known, by having a personal sign-on or icon that would separate different members of a family. In the future even voice will be use for personal identification. The additional tuning will be accomplished by attention to the appliance's location and the time of day. For example, returning to the microwave or audio and video player, technology exists for networking devices in a family home. These typical networks are unidirectional such as X-10 or bi-directional such as Ethernet. The user's home is interfaced to the Internet. Each user's appliance has a unique ID or address or URL (Uniform Resource Locator). Appliance networking over wired or wireless technologies is known.

Figure 16:
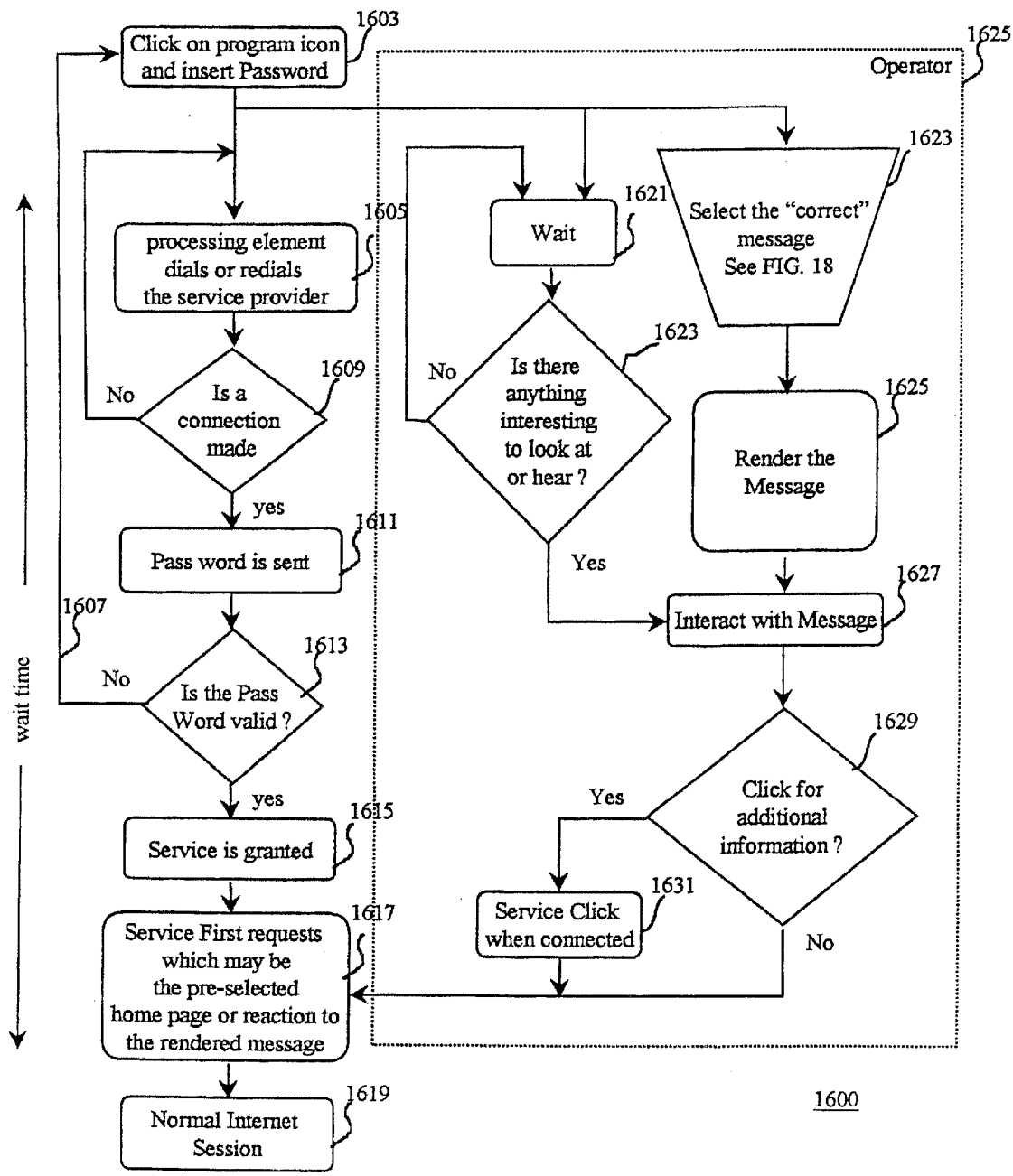
FIG. 16 is a flow diagram Internet connection according to the present invention.

FIG. 16 illustrates an flow diagram of the present invention with a Internet or Intranet connection 1600. As with the prior art, the PC operator selects the icon to start the connection process and if required inputs the password 1603. Now microprocessor initiates the connection process 1605 to a server such as an ISP. This connection could be wired: a dial up modem, a cable modem, a wired local area network (LAN) or wireless: satellite, wireless modem, microwave, or any other type of wired or wireless connection. In any case a "logical" connection is sought. At this point in time the operator 1625 is put into a wait mode 1621, while the processor and the network accomplish the task of connection. With the present invention a correct message is selected for rendered 1823. The selection or filtering of the messages is described in FIGS. 17 and 18.

This message is rendered 1625. Now the operator has something additional to look at or hear 1623 and may interact with the rendered message 1627. The operator may click to request additional information 1629. If, so this request will be serviced upon connection to the ISP. In either case the operator is connected to the Internet and either the home-page is rendered or the operator's request for more information 1617. If the connection is not made the computer may re-dial several reprogrammed times 1607. Once the connection is completed the password and certain other information is sent, such as the connection speed. The service provider receives the password and checks for validity 1611. If the password is not valid, the operator is asked to retry 1613. If the password is valid than a connection is granted 1615, and the users home page or message request is granted. At this point in time the operator has the usual Internet or Intranet session 1619.

Figure 17:
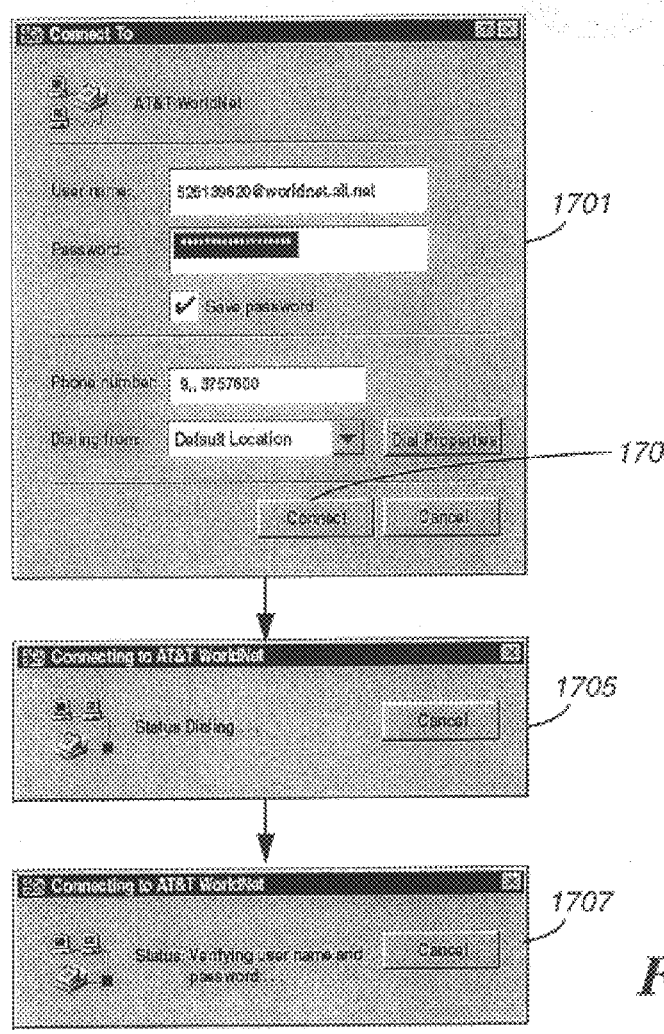
FIG. 17 is an illustration of an ISP's dialog box during Internet connection of FIG. 16 according to the present invention.

Turning now to FIG. 17 is an example of a state of the art ISP dialog box that is presented during the dial up process 1700. This is an example dialog box for step 1703 above. When the operator clicks to Logon to the Internet, a dialog box is presented 1701. As illustrated here the operator's name, hidden password, phone number to be dialed and location is displayed. When the operator clicks on "connect" 1703, the dialer software calls the ISP 1705, steps 1705 and 1709. Once a phone connection is established, the ISP verifies the user name and password 1707. If they are verified than a connection is granted steps 1711,1713, and 1715. Note that these dialog boxes are not co-resident. The first one 1701 is replaced by 1704 and then by 1707 and finally if a connection is granted by the user's Internet Browser. It should be further understood that these dialog boxes are typically in the center of the screen and that the total normal connection process takes about 30 seconds.

Figure 18:
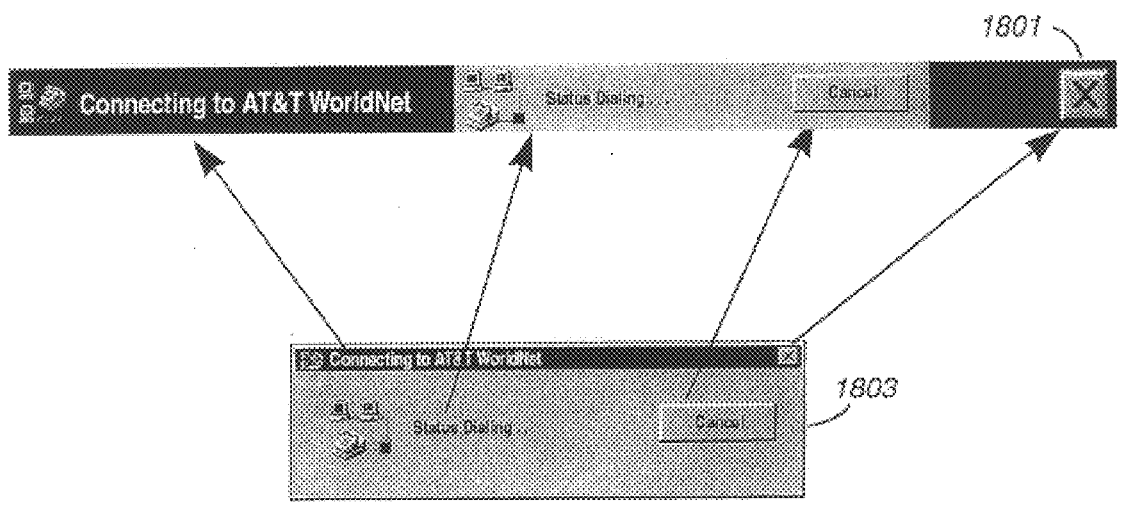
FIG. 18 is an illustration of the movement of the dialog information from FIG. 17 into a dialog strip according to the present invention.

FIG. 18 illustrates the movement of the dialog information from the dialog box to a dialog strip 1800. The dialog boxes of a normal connection 1801 are replaced with a dialog strip 1803. Note that all of the dialog information is presented to the operator. This assures display of the information on the desired process while allowing for a very large message to be displayed. It should be understood by those skilled in the art, that the exact direction of movement of the dialog information to a dialog strip 1800 is not limited to being positioned along the top of the display. Any position on the screen is contemplated including the bottom, right side, left side and the middle of the screen.

To those skilled in the art the method of resizing the dialog boxes is known. The application program 1145 is written in any available programming language such as C/C++ or assembler. The application program 1145 repositions the status information and user interaction buttons such as "dial" and "cancel". It is also understood that the dialing operation is started and then the pre-cached message is displayed. The operating system is multi-tasking so that the two tasks are being operated on in parallel. The actual dialing is programmed using Microsoft's Window 95 sub-routine called RAS (Remote Access Service). All of this programming is a particular embodiment of the present invention. Deviations, and improvements are considered to be in keeping with the true scope of the present invention.

FIG. 19 illustrates the rendering of a full page of informational message 1903 with the status of the on-going process 1901. This information is from the U.S. Patent and Trade Mark Office job placement home page. The present invention allows for this full page of non-invasive messaging. The message is a full "page" of Internet authored content. Before connection it is simply HTML (Hyper Text Markup Language) data. Once connected the page is active and one may "click" on active parts of the message for additional information. It is also understood that the "page" is scrollable and therefore may in fact be several pages long. Moreover, in an alternative embodiment, the informational message 1901 can pop-up to overlay the current dialog message with the informational message filtered as described in FIG. 20 below.

Figure 20:
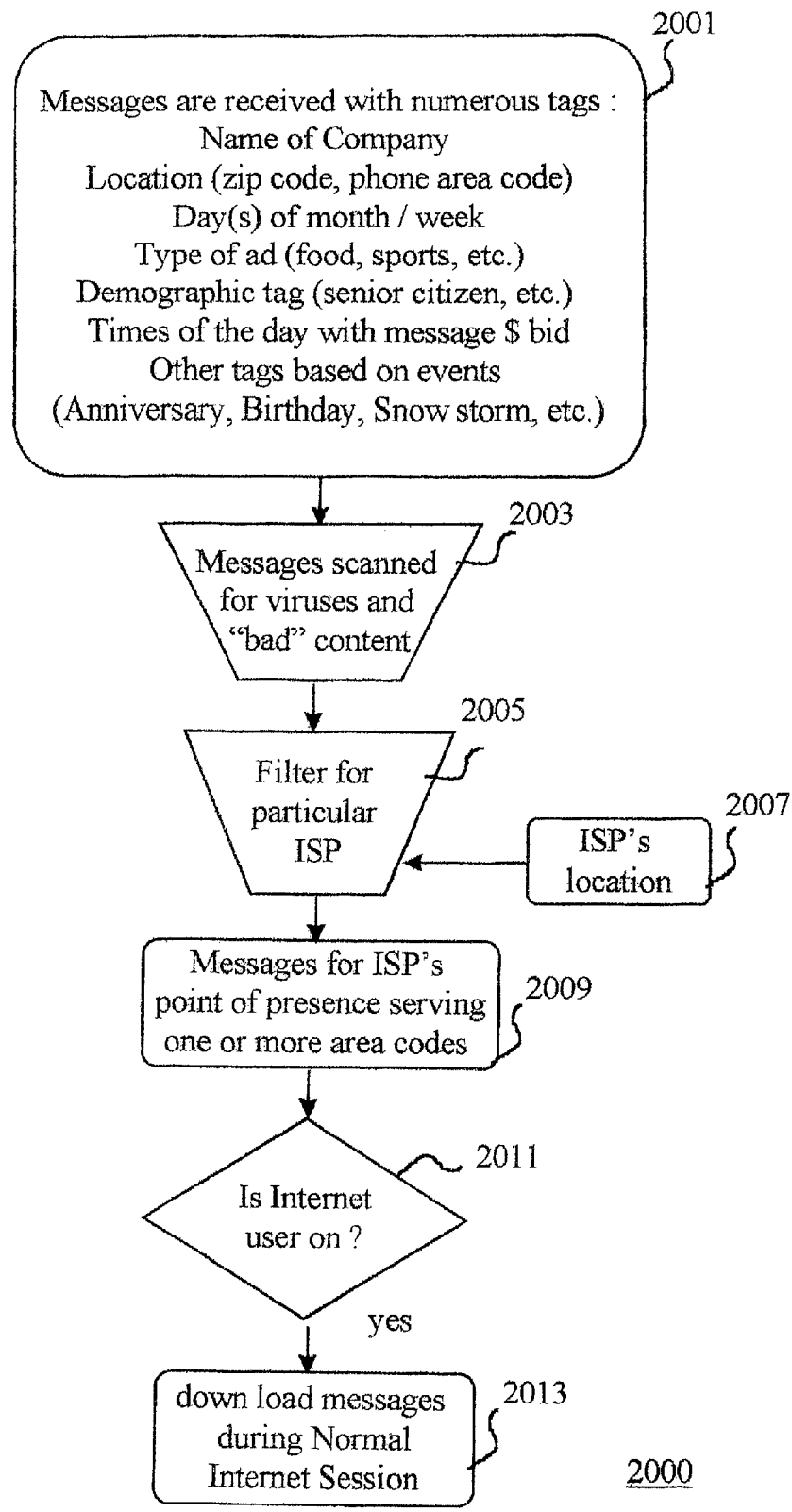
FIG. 20 is a flow diagram illustrating the filtering messages for a microprocessor-based system in FIG. 15 according to the present invention.

FIG. 20 illustrates a flow diagram of the present invention's method for filtering message delivery to the processor 2000. The messages that are rendered onto the screen and/or through the speaker have been authored and tagged 2001. For the Internet the information is simply HTML files with certain tags. These help the delivery system to filter the messages so as to maximize the users interest. These tags are such as: name of company, location of targeted zip codes, locations of the targeted area codes, specific lists of caller ID's, the dates that they shall be rendered, the type of the message, name of the particular user during this Internet session, demographic tag, the times of the day that the message shall be rendered and the amount of money the author will pay, finally any tags that are based on events. To those skilled in the art there are many methods or means for tuning or tailoring the delivery and rendering of the messages. One embodiment is described in FIG. 22 below.

When an author composes a message it is presented to a filtering process 2003 to stop all messages that are undesirable or "bad". Undesirable is defined as hate groups, smut, and the like will not be accepted, in addition the messages are scanned for viruses. The resulting total list 2005 contains all messages with their associated tags. This list is then sorted for particular ISP locations 2007 and the resultant list is sent to particular locations 2009. The individual ISP's, then, have the list of messages that are available for their subscribers. When a PC makes a connection the present invention selects from the local list and down loads ones that match the particular PC's predefined interests. This match from a local ISP to a particular PC may extend all the way down to caller ID and a particular user's stated interests and important personal dates. It should be noted that at this time none of these messages are rendered, they are simply stored in the Internet cache location located in communication server 905. It is further noted that each time the user connects with the ISP only updated messages need be sent. This completes the delivery of the filtered messages to the non-volatile storage of a PC. The process flow of FIG. 20 is not limited to running on a PC and can be run on any microprocessor-based system or appliance or data processing device as disclosed in the present invention.

Figure 21:
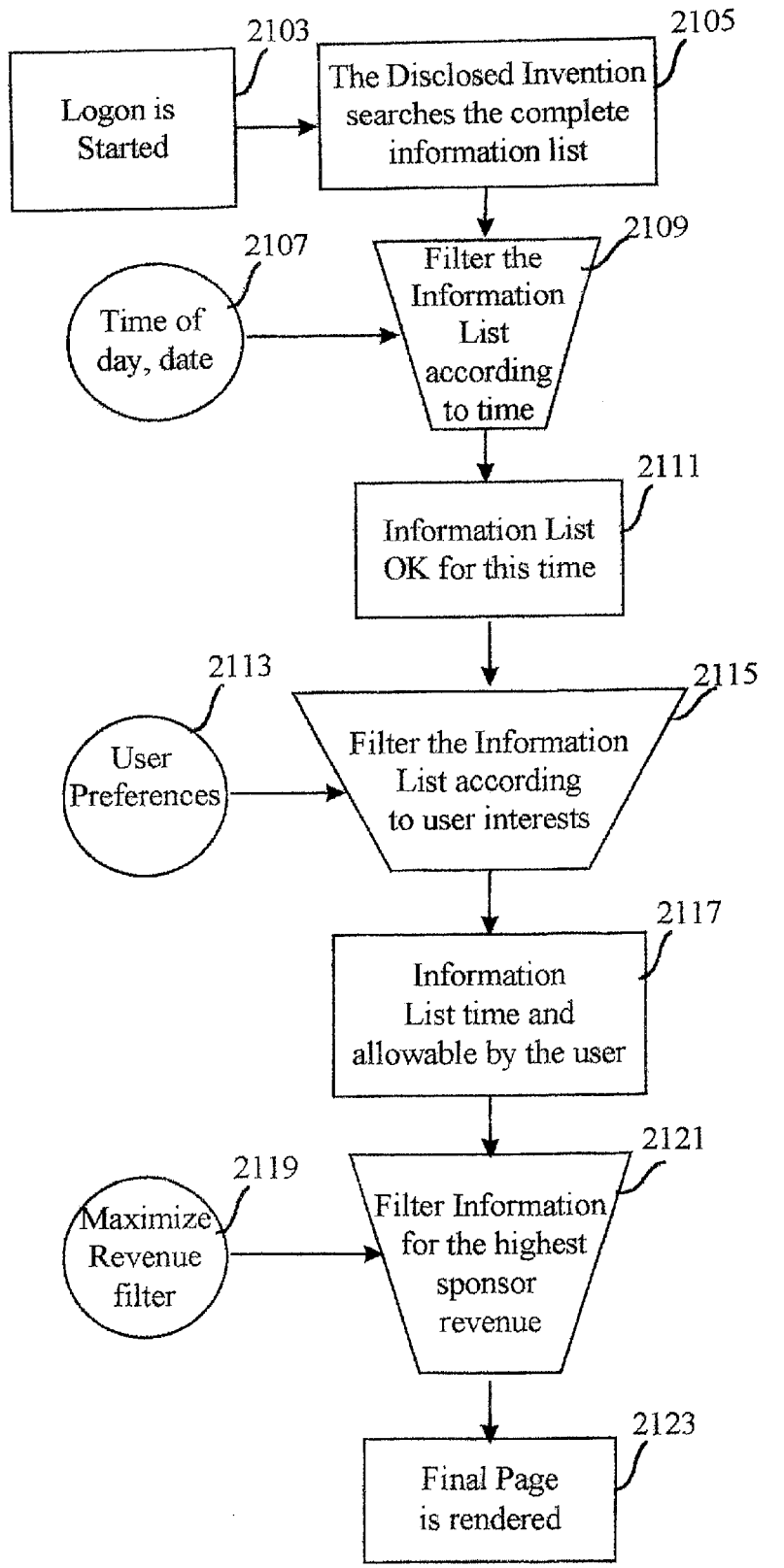
FIG. 21 is a flow diagram for the filtering messages according to FIG. 20 as performed on a microprocessor-based unit.

When the PC operator starts the Logon process, the normal Internet connection process is started. This is illustrated in FIG. 16. In FIG. 16 block 1623 a message selection filter process is illustrated. FIG. 21 illustrates this message selection process from within the PC. PC operator starts the Logon process 2103. The present invention calls the table of messages with the associated labels 2105 from the PC cache, block 1139 of FIG. 11. The labels are sorted 2109 per the time of day 2107. The time of day is available from the PC by using the systems clock function 1107 of FIG. 11. This results in a list that is suitable to show for this time of the day, on this date 2111. The present invention then sorts 2115 the list based on the user's preferences 2113. This results in a list of messages that are suitable for this time and suitable with the user 2117. Finally, the message that will be rendered 2123 is selected by the highest revenue 2119 filter 2121.

Referring back to FIG. 16 during the password validation the ISP receives the name of the rendered message 1617 so as to keep track of the messaging revenue for the ISP.

Figure 22:
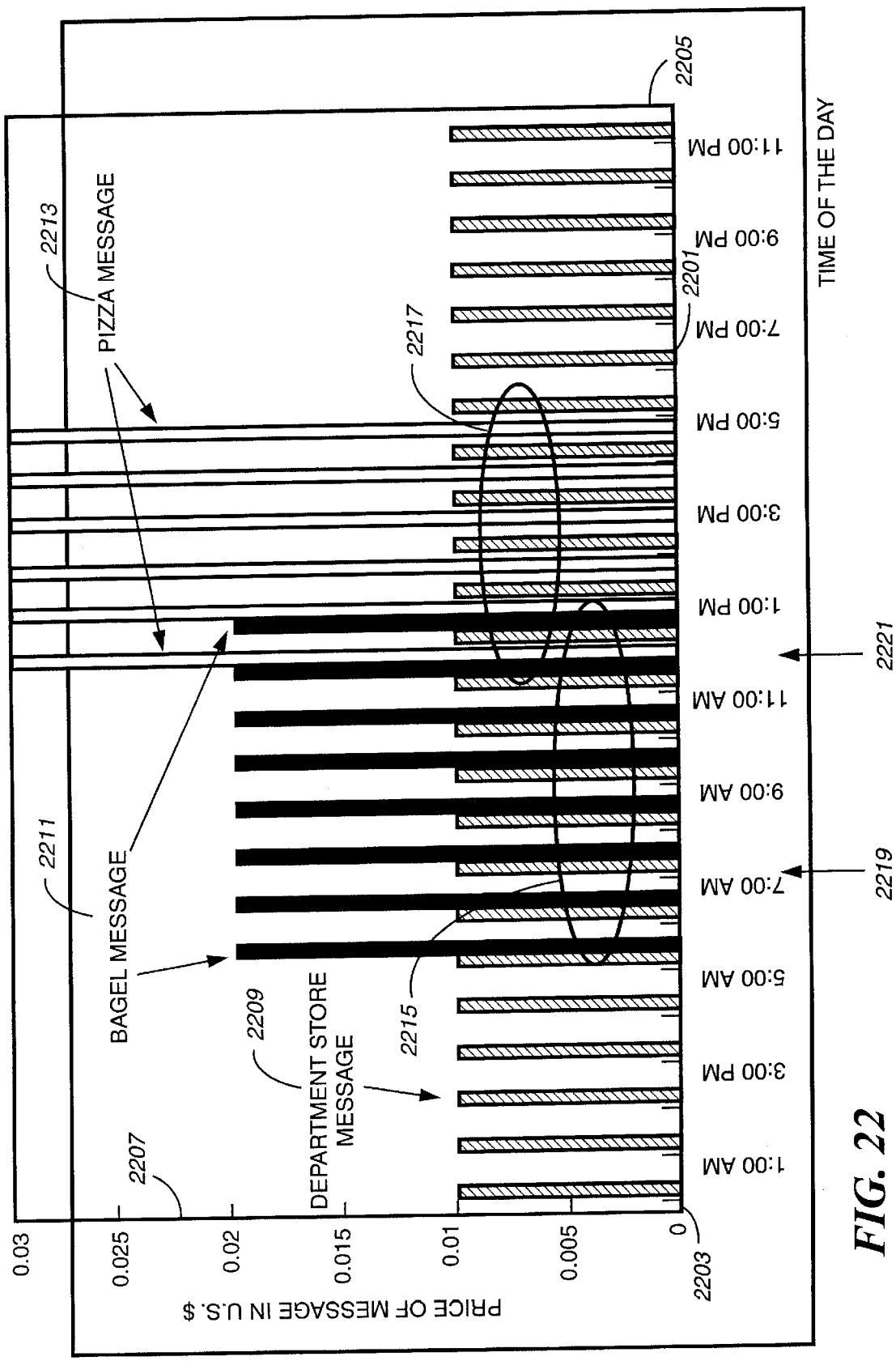
FIG. 22 is a graph of example advertisements plotted over a day with the corresponding message bidding performed on a microprocessor-based unit.

This process of sorting on the messages referenced in FIGS. 10–13, 20 and 21 is described in this embodiment. FIG. 22 is a graph of the bids for placing messages verses the time of day 2200. On the X-axis 2201 the time of day is presented from 12 midnight 2203 through the complete day, till 12 midnight of the next day 2205. On the Y-axis 2207 the cost of placing a message is plotted in US dollars. There are three messages contending for rendering. As plotted the department store will pay $0.01 for a message any time of the day 2209. The Bagel store will pay $0.02 for a message any time between 7:00 AM and 2:00 PM 2211. And a Pizza store will pay for a message $0.03 for times between 1:00 PM and 6:00 PM 2213. Note the overlaps, the Bagel store overlap the Department store between 7:00 AM and 2:00 PM 2215. In addition the Pizza store overlap both the Bagel store and the Department store between 12:00 Noon and 2:00 PM, and the Pizza store overlaps the Department store from 2:00 PM until 6:00 PM 2217. For illustrative purposes, suppose a computer operator dials onto the Internet at 9:00 AM—as denoted by 2219. In this example, the present invention, renders the Bagel store's message because the Bagel store has out bid the Department store for this time period. Once connected the present invention will have passed along the correct password for user Logon and in addition, the fact that a Bagel message was placed, the ISP is notified. The ISP can then forward the "hit" or the rendering of the advertisement and debit the Bagel store's account the corresponding $0.02 accordingly.

In a second example of the bidding process, the operator dials on at 2:00 PM—as denoted by 2221. Here there all three stores have bids. The present invention will filter on the highest bidder and in this example place the Pizza ad over both the Bagel, and Department store ad. (Department store=$0.01, Bagel message=$0.02, Pizza message=0.03). Again during the connection process the ad counter for this advertiser, in this example, the Pizza store, is incremented through the ISP.

In another embodiment of the present invention, during the original installation of the application software 1145 and in fact during on going usage, the PC operator can fill in a message interest template. This is optional but all of the normal demographic questions are asked. In addition likes and dislikes are also filled in. In a final example of the present invention filtering during a set up questionnaire the user filled-in the fact that no Pizza messages are liked. Therefore this operator would not even have the Pizza message put into the PC if the PC operator prefers not to receive Pizza advertisements. So at 12:00 PM The present invention would select the Bagel message over the Department store, as it was the highest bid. Note that from the Pizza Company's perspective there would be no wasted messages sent. From the PC operators point the present invention would adhere to the likes and dislikes table that was filled in.

There are many alternate methods and means to embody the present invention. Once the present invention renders the message the interaction with the rendered message may be one of, clicking on an Internet message, printing a coupon, dialing a toll free number, remembering a password, selecting a fax message, calling a beeper number, tuning to a particular radio or TV station. Once rendered any interaction with the message is within the true scope and spirit of the present invention.

The bidding that was described can take on several alternate methods which includes flat rate, per subscriber rates, per impression, per click through, on a commission of sales, in fact any interaction with the rendered page can be measured and set up so as to have a bidding process regulate the revenue.

The rendering of the messages and the counting of the events will assure correct revenue to the host, and proper measurement as to the message response. This is very accurate tracking for advertisers.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method in a data processing system having a display device for displaying an informational message comprising the steps of:

receiving at least one informational message from a computer readable medium, wherein said informational message has been chosen based on a geographical location of said data processing system prior to being delivered to the data processing system;

displaying a dialog-box on said display device for providing status on a processing event during connection to a network;

resizing said dialog-box automatically on said display device so as to display at least part of said status; and displaying said information message on said display device coterminously with said display of said status, until said processing event completes.

2. The method for displaying an informational message in claim 1 wherein said step of displaying a dialog-box includes displaying a dialog-box that occupies the full displayable area of said display.

3. The method for displaying an informational message in claim 1 wherein said step of displaying a dialog-box includes displaying a dialog-box for a dial-up connection screen of a dial-up service provider.

4. The method for displaying an informational message in claim 1 further comprising the steps of:

selecting which informational message to be displayed on said data processing system based upon predefined user preferences.

5. The method for displaying an informational message in claim 1, wherein said step of displaying an information message includes displaying said information message that has a scrollable HTML compatible window with active hypertext links to other information messages.

6. The method for displaying an informational message in claim 5, wherein said step of receiving said information message included receiving at least one information message from a removable computer readable storage medium.

7. The method for displaying an informational message in claim 5 wherein said step of displaying an information message includes displaying an informational message previously stored in said data processing system whereby said informational message is directed to the current time of day stored in said data processing system.

8. The method for displaying an informational message in claim 5 wherein said step of displaying an information message includes displaying an informational message previously stored on said data processing system whereby said informational message is directed to the current date stored in said data processing system.

9. The method for displaying an informational message in claim 5, wherein said information message is part of a related series of informational messages, and the method further including the step of:

responding to a user selection to display at least part of any remaining informational message previously stored in said data processing system.

10. The method for displaying an informational message in claim 5 further comprising the steps of:

tracking which informational message to be displayed on said data processing system in a log; and transferring said the contents of said log to a remote storage location; and providing at least part of said contents of said log in said remote storage location to a sponsor of said informational message.

11. The method for displaying an informational message in claim 5 further comprising the step of:

updating the messages stored in said data processing system from a remote storage location based upon predefined user preferences.

12. The method for displaying an informational message in claim 1 further comprising the steps of:

receiving a user input responsive to said informational message; and responding to said user input by connecting to a predetermined host machine.

13. The method for displaying an informational message in claim 12 wherein said step of responding to said user input by connecting to a predetermined host machine includes connecting to a predetermined Web-page.

14. The method for displaying an informational message in claim 12 further comprising the step of:

selecting an informational message to display based on a price paid for an informational message.

15. A method in a local data processing system having a display device for displaying an informational message comprising the steps of:

connecting to a remote data processing system to receive one or more informational messages that have been chosen based on a geographical location of said local data processing system prior to being delivered to said local data processing system;

storing said one or more informational messages on said local data processing system;

receiving at least one identifier which uniquely identifies a user of said data processing system;

displaying a dialog-box on said display device for providing status on a processing event;

selecting said one or more informational messages which have been stored on said local data processing system based upon at least one identifier of the user; and displaying said one or more informational messages on said display device coterminously with displaying said dialog box.

16. The method for displaying an informational message in claim 15, wherein said step of selecting an information message includes selecting said informational message based on the time of day stored in said data processing system.

17. A method in a data processing system, with a local time/date clock, for rendering an informational message comprising the steps of:

receiving at least one informational message from a computer readable medium, wherein said informational message has been chosen based on a geographical location of said information processing system prior to being delivered to said information processing system;

storing said informational message on said data processing system;

executing said user command; and receiving a user input from a user to initiate an application task;

executing said application task;

rendering status related to the progress of said executing said application task; and rendering said informational message coterminously with said rendering status, during a period of inactivity between said information processing system and the user, where said period of inactivity is terminated by either after additional user input is received or after said application task completes, wherein said informational message is selected locally on said data processing system based on said time/date clock.

18. The method in a data processing system of claim 17, wherein said step of receiving includes receiving said information message from a removable computer readable storage medium.

19. The method in a data processing system of claim 17 wherein said step of rendering an informational message includes playing an audio message.

20. The method in a data processing system of claim 17, wherein said step of executing includes executing a printing task and said step of rendering said informational message includes rendering a message during said executing of said printing task.

21. The method in a data processing system of claim 20, wherein said step of executing includes executing an operating system shutdown task and said step of rendering said informational message includes rendering a message during said executing of said shutdown task.

22. The method in a data processing system of claim 20, wherein said step of executing includes executing an operating system startup task and said step of rendering said informational message includes rendering a message during said executing of said startup task.

23. The method in a data processing system of claim 20, wherein said step executing includes executing a dial-up connection service task to an Internet Service Provider and said step of rendering said informational message includes rendering a message during said executing of said dial-up connection service task of rendering an informational message includes rendering a message based on the current date stored in said data processing system.

24. The method in a data processing system of claim 20, further comprising the step of:

selecting locally on said data processing system said informational message to render based on a price paid for an informational message.

25. The method in a data processing system of claim 20, further comprising the steps of:

tracking which said informational message is rendered in a log;

transferring the contents of said log to a remote storage location; and providing at least part of said contents of said log in said remote storage location to a sponsor of said informational message.

26. The method in a data processing system of claim 17, further comprising the step of:

selecting which said informational message to be displayed on said data processing system based upon predefined user preferences.

27. The method in a data processing system of claim 20 further comprising the step of:

updating the messages stored in said data processing system from a remote storage location based upon predefined user preferences.

28. A computer readable medium containing programming instructions for rendering an informational message on an information processing system with a local time/date clock, said program instructions comprising instructions for:

receiving at least one informational message from a computer readable medium, wherein said informational message has been chosen based on a geographical location of said information processing system prior to being delivered to said information processing system;

storing said informational message on said data processing system;

receiving a user input to initiate an application task;

executing said application task;

rendering status related to the progress of said executing said application task; and rendering said informational message coterminously with said rendering status, during a period of inactivity between said information processing system and the user, where said period of inactivity is terminated by either after additional user input is received or after said application task completes, wherein said informational message is selected locally on said data processing system based on said time/date clock.

29. The computer readable medium of claim 28, wherein said program instruction of receiving includes receiving said information message from a removable computer readable storage medium.

30. The computer readable medium of claim 28, wherein said program instruction of executing includes executing a printing task and said programming instruction of rendering said informational message includes playing an audio message during said executing of said printing task.

31. The computer readable medium of claim 28, wherein said program instruction of executing includes executing an operating system startup task and said programming instruction of rendering said informational message includes rendering a message during said executing of said startup task previously stored on said data processing system.

32. The computer readable medium of claim 31, wherein said program instruction of executing includes executing an operating system startup task and said programming instruction of rendering said informational message includes rendering a message during said executing of said startup task.

33. The computer readable medium of claim 31, wherein said program instruction of executing a dial-up connection service task to an Internet Service Provider and said programming instruction of rendering said informational message includes rendering a message during said executing of said dial-up connection service task.

34. The computer readable medium of claim 31, wherein said program instruction of rendering an informational message includes rendering a message based on the current date stored in said data processing system.

35. The computer readable medium of claim 31, further comprising the instructions for:

selecting locally on said data processing system said informational message to render based on a price paid for an informational message.

36. The computer readable medium of claim 31 further comprising the instructions for:

tracking which informational message is rendered in a log;

transferring the contents of said log to a remote storage location; and providing at least part of said contents of said log in said remote storage location to a sponsor of said informational message.

37. The computer readable medium of claim 28 further comprising the instructions for:

selecting which informational message to be displayed on said data processing system based upon predefined user preferences.

38. The computer readable medium of claim 31 further comprising the instructions for:

updating the messages stored in said data processing system from a remote storage location based upon predefined user preferences.

39. A computer readable medium containing programming instructions for rendering an informational message on a local data processing system, said program instructions comprising instructions for:

connecting to a remote data processing system to receive one or more informational messages that have been chosen based on a geographical location of said local data processing system prior to being delivered to said local data processing system;

storing said one or more informational messages on said local data processing system;

receiving at least one identifier which uniquely identifies a user of said data processing system;

displaying a dialog-box on said display device for providing status on a processing event;

selecting said one or more informational messages which have been stored on said local data processing system based upon at least one identifier of the user; and displaying said one or more informational messages on said display device coterminously with displaying said dialog box.

40. The computer readable medium of claim 39, wherein said instruction for selecting said information message includes selecting an informational message based on the time of day stored in said data processing system.

41. An data processing system having a display device for providing an informational message during a processing event, said data processing system comprising:

receiving at least one informational message from a computer readable medium, wherein said informational message has been chosen based on a geographical location of said data processing system prior to being delivered to the data processing system;

status display means for displaying a dialog-box on said display device for providing status on a processing event during connection to a network;

resizing means for resizing said dialog-box automatically on said display device so as to display at least part of said status; and information display means for displaying said information message on said display device coterminously with said display of said status, until said processing event completes.

42. The data processing system in claim 41 wherein said information display means further comprises displaying a dialog-box that occupies the full displayable area of said display.

43. The data processing system in claim 41 wherein said information display means further comprises displaying a dialog-box for a dial-up connection screen of a dial-up service provider.

44. The data processing system in claim 41 further comprising:

selecting means for selecting which informational message to be displayed on said data processing system based upon predefined user preferences.

45. The data processing system in claim 41, wherein said information display means further comprises displaying said information message that has a scrollable HTML compatible window with active hypertext links to other information messages.

46. The data processing system in claim 45, wherein said information display means further comprises receiving said information message included receiving at least one information message from a removable computer readable storage medium.

47. The data processing system in claim 45 wherein said information display means further comprises displaying an informational message previously stored in said data processing system whereby said informational message is directed to the current time of day stored in said data processing system.

48. The data processing system in claim 45 wherein said information display means further comprises displaying an informational message previously stored on said data processing system whereby said informational message is directed to the current date stored in said data processing system.

49. The data processing system in claim 45, wherein said information message is part of a related series of informational messages, and the method further comprising:

response means for responding to a user selection to display at least part of any remaining informational message previously stored in said data processing system.

50. The data processing system in claim 45 further comprising:

receiving means for receiving a user input responsive to said informational message; and responding means for responding to said user input by connecting to a predetermined host machine.

51. The data processing system in claim 45 further comprising:

updating means for updating the messages stored in said data processing system from a remote storage location based upon predefined user preferences.

52. The data processing system in claim 41 further comprising:

tracking means for tracking which informational message to be displayed on said data processing system in a log;

transferring means for transferring said the contents of said log to a remote storage location; and providing means for providing at least part of said content transferred to said remote storage location to a sponsor of said informational message.

53. The data processing system in claim 52 wherein said responding means includes responding to said user input by connecting to a predetermined host machine includes connecting to a predetermined Web-page.

54. The data processing system in claim 52 further comprising:

selecting means for selecting an informational message to display based on a price paid for said informational message.

55. A local data processing system having a display device for providing an informational message during a processing event, said data processing system comprising:

connecting to a remote data processing system to receive one or more informational messages that have been chosen based on a geographical location of said local data processing system prior to being delivered to said local data processing system;

storing said one or more informational messages on said local data processing system;

receiving at least one identifier which uniquely identifies a user of said data processing system;

display means for displaying a dialog-box on said display device for providing status on a processing event;

selecting said one or more means for selecting an informational messages which have been stored on said local data processing system based upon at least one identifier of the user; and display means for displaying said one or more informational message on said display device coterminously with displaying said dialog box.

56. The data processing system in claim 55, said selecting means for selecting said information message includes selecting an informational message based on the time of day stored in said data processing system.

57. The data processing system in claim 55, said selecting means for selecting an information message includes selecting an informational message based the price payed for said informational message.

* * * * *

UNITED STATES PATENT AND TRADEMARK OFFICE
CERTIFICATE OF CORRECTION

PATENT NO : 6,067,570
DATED : May 23, 2000
INVENTOR(S): Vadim KREYNIN et al.

It is certified that error appears in the above-identified patent and that said Letters Patent are hereby corrected as shown below:

Under Inventors, please change "Joseph M. Mosely" to --Joseph M. Mosley--.

Signed and Sealed this

First Day of May, 2001

Attest:

NICHOLAS P. GODICI

Attesting Officer     *Acting Director of the United States Patent and Trademark Office*

UNITED STATES PATENT AND TRADEMARK OFFICE
CERTIFICATE OF CORRECTION

PATENT NO. : 6,067,570
DATED : May 23, 2000
INVENTOR(S) : Vadim Kreynin, et al.

It is certified that error appears in the above-identified patent and that said Letters Patent is hereby corrected as shown below:

Column 14,
Line 39, from "to the data" to -- to said data --
Lines 62, 63 and 67, "information" to -- informational --

Column 15,
Lines 1 and 4, from "information" to -- informational --
Line 7, from "to the current" to -- to a current --
Line 10, from information" to -- informational --
Line 13, from "to the current" to -- to a current --
Line 16, from information" to -- informational --
Line 26, from "said the contents" to -- said contents --
Line 32, from "the messages" to -- said message --

Column 16,
Lines 5, 15 and 16, from "information" to -- informational --
Line 19, from "said user" to -- a user --
Line 27, from "information" to -- informational --

Column 17,
Lines 22, 27, 28 and 37, from "information" to -- informational --
Line 66, from "executing a dial-up" to -- executing includes executing a dial-up --

Column 18,
Line 57, from "An data" to -- A data --
Line 60, from "receiving at least" to -- receiving means for receiving at least --
Line 64, from "to the data" to -- to said data --

Column 19,
Lines 4-5, from "information" to -- informational --
Lines 23, and 24, from "information" to -- informational --
Lines 27-29, from "information display means further comprises receiving said information message included receiving at least one information" to -- receiving means further comprises receiving at least one informational --
Line 44, from "information" to -- informational --

UNITED STATES PATENT AND TRADEMARK OFFICE
CERTIFICATE OF CORRECTION

PATENT NO.    : 6,067,570
DATED         : May 23, 2000
INVENTOR(S)   : Vadim Kreynin, et al.

It is certified that error appears in the above-identified patent and that said Letters Patent is hereby corrected as shown below:

Column 20,
Line 3, from "the messages" to -- said message --
Line 10, from "said the contents" to -- said contents --
Lines 16-18, from "includes responding to said user input by connecting to a predetermined host machine includes connecting" to -- includes connecting --
Line 27, from "connecting to" to -- connecting means for connecting to --
Line 32, from "storing said" to -- storing means for storing said --
Line 34, from "receiving at" to -- receiving means for receiving at --
Lines 46, and 52, from "information" to -- informational --

Signed and Sealed this

Twenty-third Day of October, 2001

Attest:

*Nicholas P. Godici*

NICHOLAS P. GODICI
*Attesting Officer*      *Acting Director of the United States Patent and Trademark Office*